(12) United States Patent
Honda et al.

(10) Patent No.: US 6,606,451 B2
(45) Date of Patent: *Aug. 12, 2003

(54) IMAGE REPRODUCING APPARATUS AND IMAGE CONTROL METHOD

(75) Inventors: Tsutomu Honda, Sakai (JP); Hideki Nagata, Sakai (JP); Tougo Teramoto, Wakayama (JP)

(73) Assignee: Minolta Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,397

(22) Filed: Feb. 10, 1998

(65) Prior Publication Data

US 2001/0014202 A1 Aug. 16, 2001

(30) Foreign Application Priority Data

Feb. 12, 1997 (JP) ............................................. 9-027603
Feb. 12, 1997 (JP) ............................................. 9-027604
Feb. 12, 1997 (JP) ............................................. 9-027606

(51) Int. Cl.$^7$ ................................................ H04N 5/91
(52) U.S. Cl. .................................................... 386/95
(58) Field of Search .......................... 386/46, 95, 107, 386/117, 121, 120, 83, 112; 358/906

(56) References Cited

U.S. PATENT DOCUMENTS

| | | | |
|---|---|---|---|
| 5,377,253 A | * 12/1994 | Ifuku | 378/162 |
| 5,436,682 A | 7/1995 | Katoh et al. | |
| 5,459,582 A | * 10/1995 | Takahashi | 386/112 |
| 5,546,191 A | * 8/1996 | Hibi et al. | 386/95 |
| 5,576,950 A | * 11/1996 | Tonomura et al. | 386/121 |
| 5,621,579 A | * 4/1997 | Yuen | 386/121 |
| 5,657,074 A | 8/1997 | Ishibe et al. | |
| 5,664,243 A | 9/1997 | Okada et al. | |
| 5,786,955 A | * 7/1998 | Kori et al. | 386/121 |
| 5,974,218 A | * 10/1999 | Nagasaka et al. | 386/95 |

* cited by examiner

Primary Examiner—Huy Nguyen
(74) Attorney, Agent, or Firm—McDermott, Will & Emery

(57) ABSTRACT

An image reproducing apparatus reproduces a still picture recorded on a silver-halide film and a moving picture recorded on a video tape. The image reproducing apparatus also reproduces simultaneous shooting information recorded on both the film and the video tape. The image reproducing apparatus has a controller which controls reproduction of the pictures recorded on the film and the video tape in accordance with the simultaneous shooting information.

23 Claims, 34 Drawing Sheets

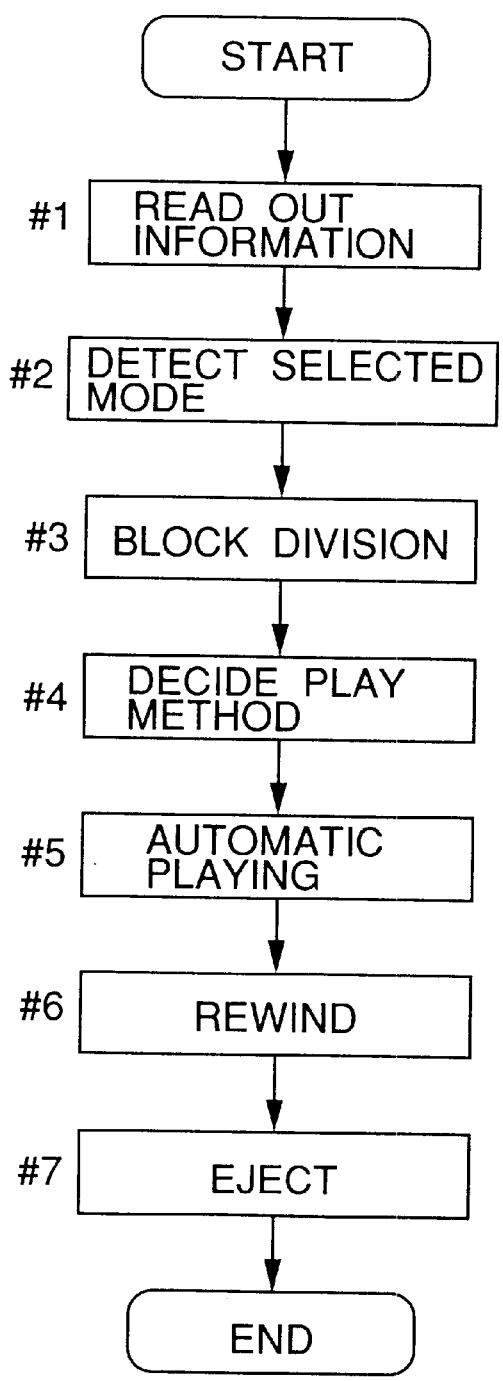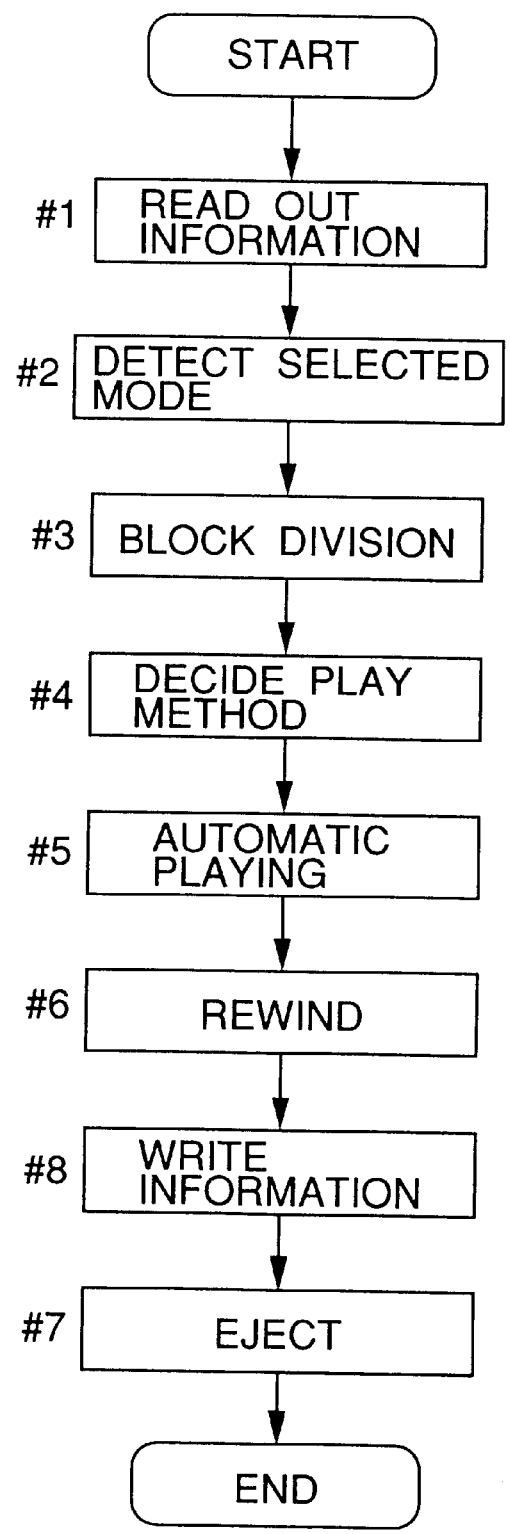

FIG.7

| NO. | SILVER-HALIDE FILM SHOOTING INFORMATION | VIDEO SHOOTING INFORMATION |
|---|---|---|
| 1 | SHOOTING DATE | SHOOTING DATE |
| 2 | SHOOTING TIME | SHOOTING TIME |
| 3 | SIMULTANEOUS SHOOTING INFORMATION | SIMULTANEOUS SHOOTING INFORMATION |
| 4 | | FRAME LINK INFORMATION |
| 5 | FILM TOP/BOTTOM DIRECTION | |
| 6 | PRINT REPRODUCTION ASPECT RATIO | |
| 7 | CONTINUOUS SCENE | |
| 8 | FRAME TITLE | |
| 9 | FILM TITLE | |
| 10 | CAMERA ID CODE | |

FIG.14

| BLOCK NO. | VIDEO RECORDING START | VIDEO RECORDING END | SILVER-HALIDE FILM SHOOTING TIME | VIDEO SHOOTING TIME(C) | NUMBER OF SILVER-HALIDE FILM PICTURES SHOT(D) | (C/D) | WEIGHT(B) | WEIGHT(A) |
|---|---|---|---|---|---|---|---|---|
| 1A | 10/10:00:00 | 10/10:05:00 | 10/10:02:00<br>10/10:03:00<br>10/10:04:00 | 5:00 | 3 | 1:40 | 3 | 1 |
| 1B | 10/10:25:00 | 10/10:28:00 | 10/10:26:00 | 3:00 | 1 | 3:00 | 4 | |
| 1C | 10/10:38:00 | 10/10:45:00 | 10/10:39:00<br>10/10:42:00<br>10/10:42:30<br>10/10:43:00<br>10/10:44:00 | 7:00 | 5 | 1:24 | 2 | |
| 1D | | | 10/10:46:00<br>10/10:48:30<br>10/10:55:00<br>10/10:56:00<br>10/10:59:00 | 1:00 | 5 | 0:12 | 1 | |
| 1E | 10/12:01:00 | 10/12:05:00 | 10/12:04:00 | 4:00 | 1 | 4:00 | 5 | |
| 2A | 12/12:00:00 | 12/12:04:00 | 12/12:02:00 | 4:00 | 1 | 4:00 | | 3 |
| 3A | 13/12:24:00 | 13/12:28:00 | 13/12:26:00<br>13/12:27:00 | 4:00 | 2 | 2:00 | 3 | 2 |
| 3B | 13/12:58:12 | | 13/12:58:00 | 0:12 | 1 | 0:12 | 1 | |
| 3C | | 13/13:06:00 | 13/13:01:00<br>13/13:01:30<br>13/13:02:00<br>13/13:03:00 | 7:48 | 4 | 1:57 | 2 | |

FIG.17

| BLOCK NO. | VIDEO RECORDING START | VIDEO RECORDING END | SILVER-HALIDE FILM SHOOTING TIME | VIDEO SHOOTING TIME(C) | NUMBER OF SILVER-HALIDE FILM PICTURES SHOT(D) | C/D(B) | WEIGHT(B) | C/D(A) | WEIGHT(A) |
|---|---|---|---|---|---|---|---|---|---|
| 1A | 10/10:00:00 | 10/10:05:00 | 10/10:02:00<br>10/10:03:00<br>10/10:04:00 | 5:00 | 3 | 1:40 | 2 | 1:54 | 1 |
| 1B | 10/10:25:00 | 10/10:28:00 | 10/10:26:00 | 3:00 | 1 | 3:00 | 3 | | |
| 1C | 10/10:38:00 | 10/10:45:00 | 10/10:39:00<br>10/10:42:00<br>10/10:42:30<br>10/10:43:00<br>10/10:44:00 | 7:00 | 5 | 1:24 | 1 | | |
| 1D | 10/12:01:00 | 10/12:05:00 | 10/12:04:00 | 4:00 | 1 | 4:00 | 4 | | |
| 2A | 12/12:00:00 | 12/12:04:00 | 12/12:02:00 | 4:00 | 1 | 4:00 | 2 | 4:00 | 3 |
| 3A | 13/12:24:00 | 13/12:28:00 | 13/12:26:00<br>13/12:27:00 | 4:00 | 2 | 2:00 | 2 | 1:58 | 2 |
| 3B | 13/12:58:12 | 13/13:06:00 | 13/13:01:00<br>13/13:01:30<br>13/13:02:00<br>13/13:03:00 | 7:48 | 4 | 1:57 | 1 | | |

TYPE 1

TYPE 2

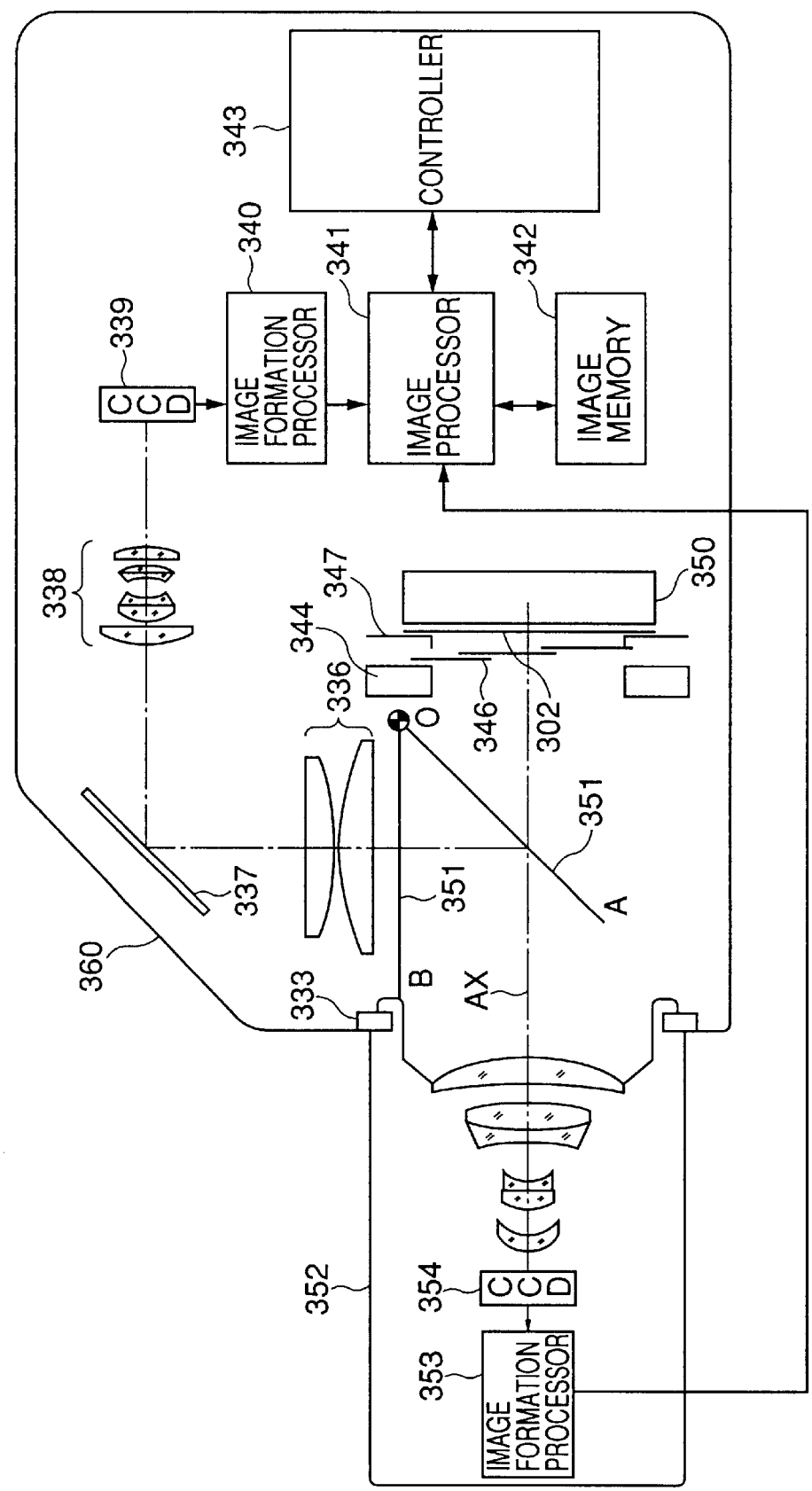

IMAGE REPRODUCING APPARATUS AND IMAGE CONTROL METHOD

This application is based on applications Nos. H09-027603, H09-027604, and H09-027606 filed in Japan, the content of which is hereby incorporated by reference.

BACKGROUND OF THE INVENTION

1. Field of the Invention

The present invention relates to an image reproducing apparatus and an image control method for reproducing images by reading them, on the one hand, from a recording medium on which still pictures are recorded and, on the other hand, from another recording medium on which moving pictures are recorded.

2. Description of the Prior Art

Conventionally, video pictures and silver-halide film pictures are taken separately, and are viewed separately. Some image shooting apparatuses have both a video picture shooting function and a silver-halide film picture shooting function, and permit silver-halide film pictures to be shot simultaneously while a video picture is being shot, but even they allow only separate viewing of silver-halide film pictures and video pictures.

Thus, the capability of such shooting apparatuses for simultaneous shooting is far from being effectively exploited, as long as pictures of different shooting types, even if taken simultaneously, need to be viewed separately. Moreover, it is often the case that a recorded video picture, in its unedited state, is too lengthy for enjoyable viewing. Especially, it would take an unduly long time to view a long and pointlessly shot video picture without editing it. For this reason, although people do not bother to take much trouble in shooting video pictures, they tend to be unwilling to view already recorded video pictures very often, and many of the recorded video pictures are likely to be stored away, never to be viewed again.

In image reproducing apparatuses such as slide projectors, a series of images is presented successively by sequential feeding of slides that is achieved manually or semiautomatically through operation of a switch. This type of image reproducing apparatus deals only with silver-halide film pictures.

In a slide show, a plurality of slide projectors are used for presentation. Conventionally, a slide show is prepared on a personal computer by an operator who, for example, edits the order in which images are to be presented and the sound with which the images are to be accompanied. In such a slide show, reproduction of images is controlled by a tape or disk on which the program to be run as well as the sound to be reproduced is recorded.

In image reproducing apparatuses such as photo players, as silver-halide film pictures are reproduced on a monitoring device such as a television monitor, special effects are automatically added such as panning, i.e. sequential reproduction of an image from its left end to its right end, or tilting, i.e. similar reproduction of an image from its top end to its bottom end, and electronic music is added as well.

However, conventional image reproducing apparatuses and image control methods as mentioned above have the following disadvantages. In the above-mentioned slide projector, it is necessary to feed slides manually or through operation of a switch in order to view a series of images. In the above-mentioned slide show, one silver-halide film picture after another can be presented automatically, but it is necessary that an operator prepare the slide show in advance by entering an appropriate program and editing accompanying sound. In the above-mentioned photo player, it is not necessary to enter a program or edit sound, but reproduced images are always accompanied with music that has nothing to do with the images.

Some image reproducing apparatuses can, when they play back a video tape that has shooting dates and times recorded in data recording regions, search for a location where a new date starts before starting playback, or search for such locations one after another to play back 10 seconds from each location.

SUMMARY OF THE INVENTION

An object of the present invention is to provide an image reproducing apparatus and an image control method that permit, through simple operation, mixed viewing of moving pictures such as video pictures and still pictures such as silver-halide film pictures and that can present those pictures with due vividness typical of simultaneously shot pictures.

Another object of the present invention is to provide an image reproducing apparatus that automatically switches still pictures such as silver-halide film pictures in accordance with information related to simultaneous shooting.

Still another object of the present invention is to provide an image reproducing apparatus that can also reproduce, if necessary, sound associated with still pictures presented.

A further object of the present invention is to provide an image reproducing apparatus that reproduces moving pictures such as video pictures in accordance with information related to simultaneous shooting and that can present those pictures with due vividness typical of simultaneously shot pictures.

To achieve the above objects, according to one aspect of the present invention, an image reproducing apparatus for use with a system that records still pictures on a first recording medium and moving pictures on a second recording medium and that records simultaneous shooting information on both recording media when the pictures are recorded simultaneously on both recording media is provided with a controller for controlling reproduction of the pictures recorded on the first recording medium in accordance with the simultaneous shooting information.

According to another aspect of the present invention, in an image control method for use with a system that records a still picture on a first recording medium and a moving picture on a second recording medium and that records simultaneous shooting information on both recording media when the pictures are recorded simultaneously on both recording media, reproduction of the picture recorded on the first recording medium is controlled in accordance with the simultaneous shooting information.

According to another aspect of the present invention, an image reproducing apparatus for use with a system that records a still picture on a first recording medium and a moving picture on a second recording medium and that records simultaneous shooting information on both recording media when the pictures are recorded simultaneously on both recording media is provided with a controller for controlling reproduction of the picture recorded on the second recording medium in accordance with the simultaneous shooting information.

According to another aspect of the present invention, in an image control method for use with a system that records a still picture on a first recording medium and a moving picture on a second recording medium and that records simultaneous shooting information on both recording media when the pictures are recorded simultaneously on both recording media, reproduction of the picture recorded on the second recording medium is controlled in accordance with the simultaneous shooting information.

According to another aspect of the present invention, an image reproducing apparatus for use with a system that records still pictures on a first recording medium and moving pictures on a second recording medium and that records simultaneous shooting information on both recording media when the pictures are recorded simultaneously on both recording media is provided with a controller for controlling simultaneous reproduction of the pictures recorded on the first and second recording media in accordance with the simultaneous shooting information.

According to still another aspect of the present invention, in an image control method for use with a system that records still pictures on a first recording medium and moving pictures on a second recording medium and that records simultaneous shooting information on both recording media when the pictures are recorded simultaneously on both recording media, wherein reproduction of the pictures recorded on the first and second recording media is controlled in accordance with the simultaneous shooting information.

BRIEF DESCRIPTION OF THE DRAWINGS

This and other objects and features of this invention will become clear from the following description, taken in conjunction with the preferred embodiments with reference to the accompanied drawings in which:

FIGS. 5A and 5B are flowcharts showing the outline of the operation sequence of the first embodiment;

FIG. 7 is a diagram showing the structure of the shooting information used in the first embodiment;

FIG. 14 is a diagram showing how block division and weighting are performed in the silver-halide-picture-weighted reproduction mode in the first embodiment;

FIG. 17 is a diagram showing how block division and weighting are performed in the video-weighted reproduction mode in the first embodiment;

FIG. 34 is a block diagram of another example of the same portion shown in FIG. 33.

DESCRIPTION OF THE PREFERRED EMBODIMENTS

First Embodiment

A first embodiment of the present invention will be described with reference to FIGS. 1 to 17 and 20. The image reproducing apparatus 1 (FIG. 1) of the first embodiment provides effective image viewing by obtaining matching between a silver-halide film and a video tape where images are recorded by an image shooting apparatus (FIG. 20) capable of simultaneous shooting. Note that, throughout the specification, simultaneous shooting means performing silver-halide film shooting during video shooting. Note also that, throughout the specification, "image" is substantially synonymous with "video".

Figure 20:
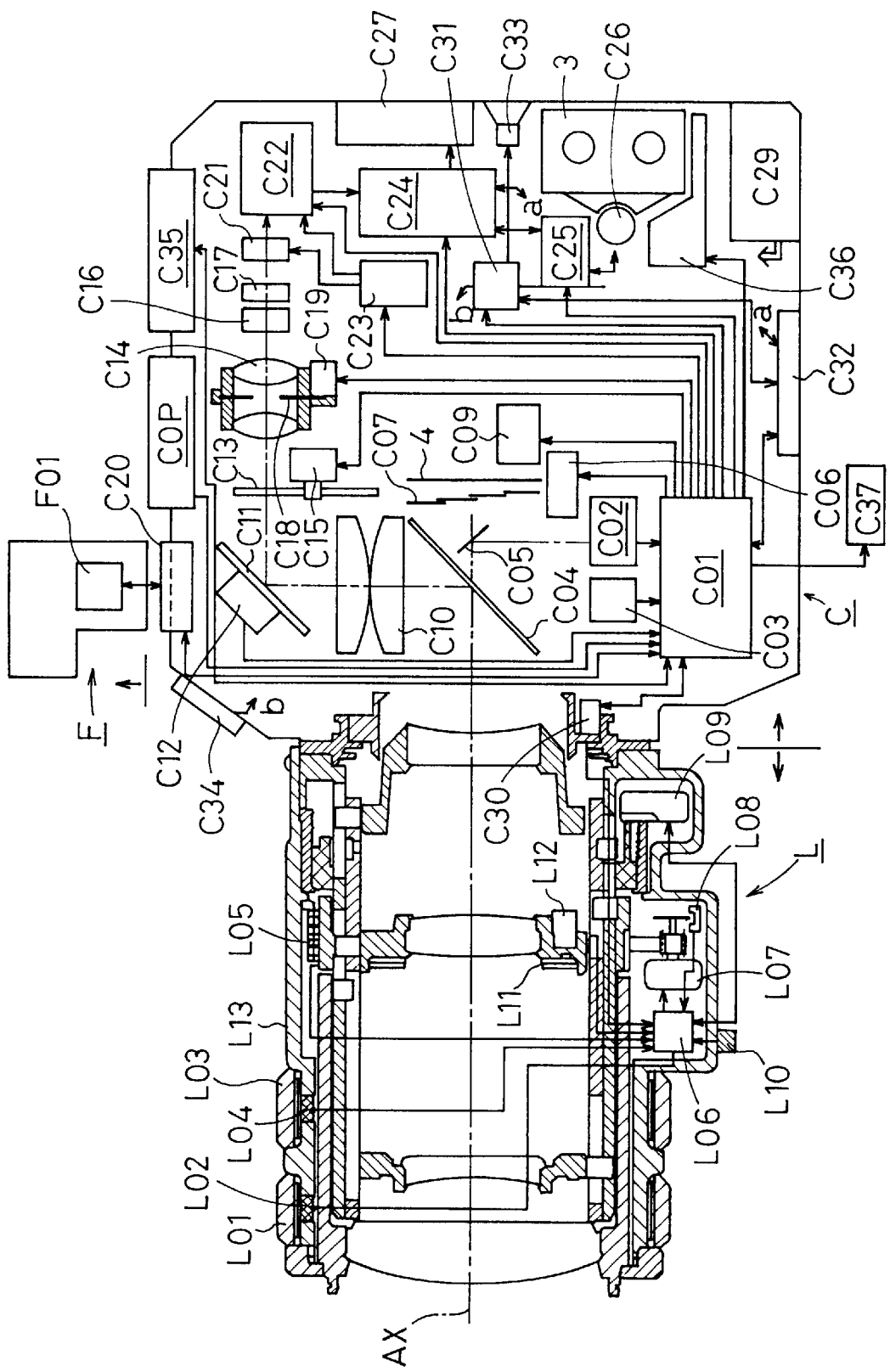
FIG. 20 is a block diagram of the image shooting apparatus commonly used with the first and second embodiments.

First, the image shooting apparatus will be described. FIG. 20 schematically shows the construction of the image shooting apparatus capable of simultaneous shooting. The image shooting apparatus is provided with a camera body C, a main lens L serving as a main optical system and a lighting-cum-flash generator (hereinafter, referred to "flash and light") F. Subsequently-described video shooting optical system and silver-halide film shooting optical system have common elements. The reference numerals of the elements on the side of the camera body C, the elements on the side of the main lens L and the elements on the side of the flash and light F are preceded by the letters C, L and F, respectively, for easy collation between the figure and the description.

While the camera body C and the main lens L, and the camera body C and the flash and light F are separately formed in the figure, the camera body C and the main lens L, the camera body C and the flash and light F, or these three may be integrally formed. The video shooting optical system and the silver-halide film shooting optical system may be independent of each other. While FIG. 20 shows an SLR (single-lens reflex) type in which a silver-halide film shooting system and an electronic image shooting system are integrated, these shooting systems may be formed according to different methods.

As shown in FIG. 20, the following are provided on the side of the camera body C: a silver-halide film shooting section including a shutter driver C06, a shutter C07, a film 4 and a film feed controller C09; a silver-halide film information recorder C37; and a video signal recording and reproducing section including an image signal processor C24, a recording/reproduction converter C25, a head C26, an EVF (electronic viewfinder) C27 serving as an electric displayer, a recording medium 3 and a recording medium driver C36.

In FIG. 20, the construction of the side of the main lens L will be described. L01 and L03 represent operation rings manually rotated by the user. L01 represents a focus operation ring for performing focusing and L03 represents a zoom operation ring for performing zooming. L13 represents a stationary barrel. L02 and L04 represent operation ring condition detectors for detecting rotation of the operation rings L01 and L03, respectively. The detectors L02 and L04 include encoders.

L05 represents a focus detector for detecting the focal length of the main lens L. L06 represents a lens-side microcomputer serving as a calculation controller on the side of the main lens L. L07 represents a zoom motor for driving zooming of the main lens L. L08 represents a zoom motor monitor for detecting rotation condition of the zoom motor L07. The zoom motor monitor L08 includes, for example, a photointerruptor.

L09 represents a focus motor for driving focusing of the main lens L. L10 represents an AF/MF switching button for switching between automatic focusing and manual focusing. L11 represents a main lens aperture stop. L12 represents a main lens aperture stop controller. The main lens aperture stop controller L12 is constituted by a stepping motor for driving the aperture stop and an aperture stop condition detector.

The focus and zoom operation rings L01 and L03 are rotatably fitted on the periphery of the stationary barrel L13 thereby to be rotatable about the optical axis AX of the main lens L. By rotating the focus operation ring L01, power focusing is performed. By rotating the zoom operation ring L03, power zooming is performed.

Next, the construction of the side of the camera body C will be described. C01 represents a camera-side microcomputer serving as a calculation controller on the side of the camera body C. With the side of the main lens L, the camera-side microcomputer C01 exchanges information through a communication/power supply contact C30. With the flash and light F, the camera-side microcomputer C01 exchanges information with a flash-side calculation controller F01 through an accessory shoe C20 serving as a flash contact.

C05 represents an AF auxiliary mirror provided behind a pellicle mirror C04. The light coming from a subject and having passed through the main lens L is split at the pellicle mirror C04, and is further split at the AF auxiliary mirror C05 and directed to a focus detector C02. The focus detector C02 transmits focus information to the camera-side microcomputer C01. The focus information processed by the camera-side microcomputer C01 is sent to the lens-side microcomputer L06. By a command of the lens-side microcomputer L06, the focus motor L09 is driven to perform focusing.

C06 represents the shutter driver for controlling the release of the shutter C07 according to a command from the camera-side microcomputer C01. Specifically, the camera-side microcomputer C01 supplies a command signal to the shutter driver C06 based on information from an operation portion COP and a brightness detector C12, etc. Reference numeral 4 represents the film which is exposed to light obtained by the release of the shutter C07 to thereby form a latent image of a subject image. C09 represents the film feed controller for advancing and rewinding the film by being driven by a motor incorporated in the camera body.

The other part of the light split by the pellicle mirror C04 is directed to a CCD image sensor C21 by way of a relay optical system including a condenser lens C10, a reflecting mirror C11, an ND filter C13 and a relay lens C14, and an optical low-pass filter C16 and an IR cut filter C17. The reflecting mirror C11 is partly semitransparent, so that part of the light is directed into the brightness detector C12 through the semitransparent portion of the mirror C11 to detect the brightness of the subject.

C15 represents an ND filter controller for controlling the ND filter C13 based on ND density information set by the camera-side microcomputer C01. The ND density information is determined by the microcomputer C01 based on the difference in sensitivity between the film 4 loaded in the camera body C and the CCD image sensor C21 and the brightness of the subject detected by the brightness detector C12. The relay optical system includes a relay aperture stop C18 and the quantity of the light directed to the CCD image sensor C21 is controlled by a relay aperture stop controller C19.

The CCD image sensor C21 photoelectrically converts the light from the subject based on a drive pulse from a CCD drive pulse generator C23 having received a command from the camera-side microcomputer C01. The photoelectrically converted electric signal is sent to an sensor signal processor C22 for analog processing such as sub-sampling, and then, is A/D (analog to digital) converted and sent to the image signal processor C24.

The image signal processor C24 includes a processing portion for performing γ conversion, white balance (WB) conversion and conversion to a brightness/color difference (Y/C) signal, a memory for recording image data from the processor, a calculation controller for performing image processing in response to a command from the camera-side microcomputer C01, a memory for recording an image signal from the calculation controller, and a superimposer for performing superimposition. The image signal processed by the image signal processor C24 is sent to the EVF C27, to the recording/reproduction converter C25 and to an external output port C32. In FIG. 20, of the transmission path between the image signal processor C24 and the external output port C32, a portion a-a is omitted for convenience of illustration.

The EVF C27 includes a viewfinder having a liquid crystal viewfinder or a CRT, etc. and a converter for converting an image signal from the image signal processor C24 into a display driving signal, and performs image display. C35 represents an operation display portion which has a large-size liquid crystal display panel and a lamp and displays information on operation of the operation portion COP.

The recording/reproduction converter C25 encodes into a recording format an image signal from the image signal processor C24, an audio signal from an audio processor C31 and various signals and information from the camera-side microcomputer C01, and transmits them to the head C26. Reference numeral 3 represents the recording medium as which a magnetic tape, a magneto-optic disk and a semiconductor memory (for example, RAM) may be used. In this embodiment, magnetic tape of a digital video cassette (hereinafter, referred to as "DVC") is used.

C36 represents the recording medium driver for driving the recording medium 3. The signals sent to the head C26 are recorded onto the recording medium 3 driven by the recording medium driver C36. Likewise, data recorded on the recording medium C36 are read out by the head C26 and decoded by the recording/reproduction converter C25 to reproduce image signals, audio signals, various signals and information, which are sent to the image signal processor C24 or the audio processor C31.

C37 represents the silver-halide film information recorder for recording various information on a silver-halide film information recording area of the film. The silver-halide film information recorder C37 comprises a converter for converting information from the camera-side microcomputer C01 to a recording format and a head for performing recording. The silver-halide film information recorder C37 is sometimes formed so as to perform reproduction as well as recording.

Sound is picked up by a stereo microphone C34 provided in an appropriate position on the front surface of the camera body C and processed by the audio processor C31. The audio signal processed by the audio processor C31 is sent to the recording/reproduction converter C25, a speaker C33 and the output port C32. In FIG. 20, of the transmission path between the audio processor C31 and the microphone C34, a portion b—b is omitted for convenience of illustration. C29 represents a battery provided on the side of the camera body C for supplying power to the camera body C and the main lens L, etc.

C03 represents a camera shake detector for detecting shake of the camera to which the main lens L is attached and transmits the detection signal to the camera-side microcomputer C01. In camera shake compensation at the image sensor signal processor, a readout area of the CCD image sensor C21 is controlled based on the detection signal.

In the operation portion COP, an operation changeover switch also used as the main switch is provided. By operating this switch, selection is made among operation modes OFF, $P_M$, $P_H$, $M_V$, V, $S_V$ and E. When the changeover switch is set at OFF, the entire apparatus is turned off. When the switch is set at $P_M$, the apparatus is placed in a simultaneous shooting mode in which video movies and silver-halide film photos can be simultaneously shot. When the switch is set at $P_H$, the apparatus is placed in a silver-halide film shooting mode in which silver-halide film shooting can be performed. When the switch is set at $M_V$, the apparatus is placed in a video shooting mode in which video movies can be shot. When the switch is set at V, the apparatus is placed in a video reproduction mode in which recorded video is reproduced. When the switch is set at $S_V$, the apparatus is placed in a still video shooting mode in which still video images can be shot. When the switch is set at E, the apparatus is placed in an edit mode in which information recorded on a subsequently-described shooting information recording area on the silver-halide film 4 is rewritten. The operation portion COP includes a release button for silver-halide film shooting, a zoom button and a recording ON/OFF button for controlling start and stop of recording.

Figure 3:
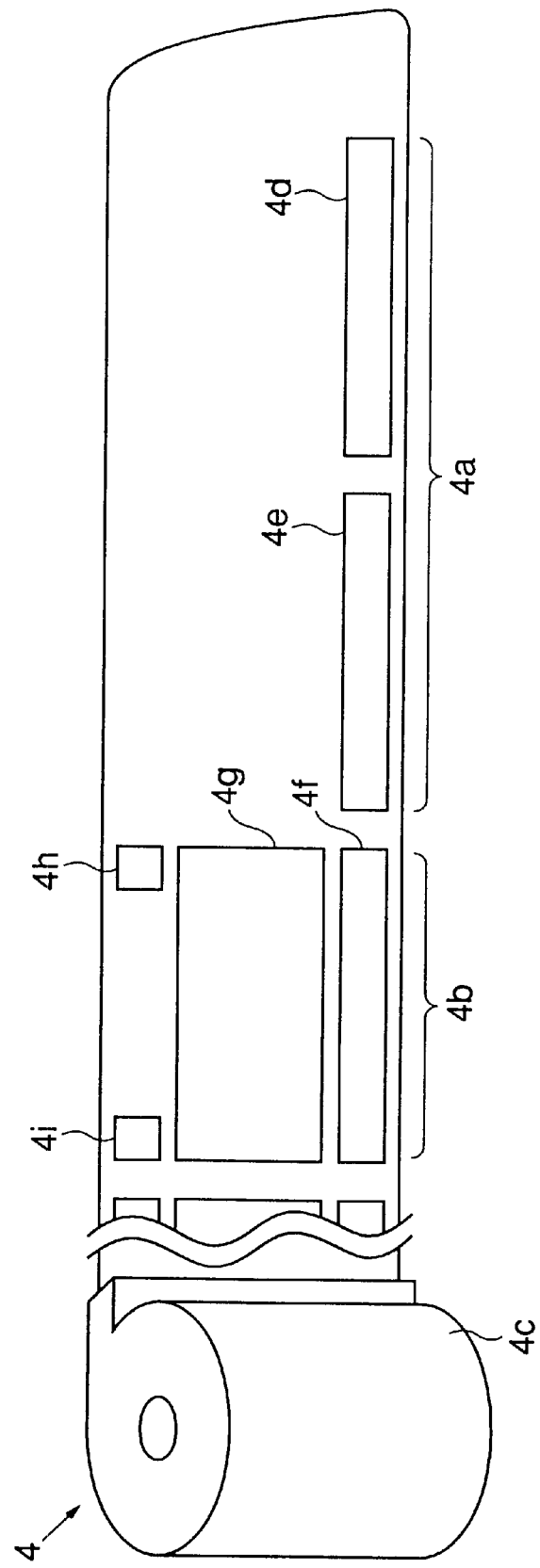
FIG. 3 is a diagram schematically showing the silver-halide film used in the first embodiment.

FIG. 3 shows a condition where the silver-halide film 4 is pulled out of a film cartridge 4c. On the film 4 partly coated with a magnetic substance, information can be recorded as magnetic information. In the film 4, reference numeral 4a represents a film leader having recording tracks 4d and 4e for recording information on all things related to the film thereon. Reference numeral 4b represents a portion corresponding to the first frame and including an imaging portion 4g, perforations 4h and 4i and a track 4f for recording magnetic information corresponding to each frame thereon. The frame corresponding portion 4b is followed by like frame corresponding portions in the number of shooting possible frames to the film end portion.

Figure 2:
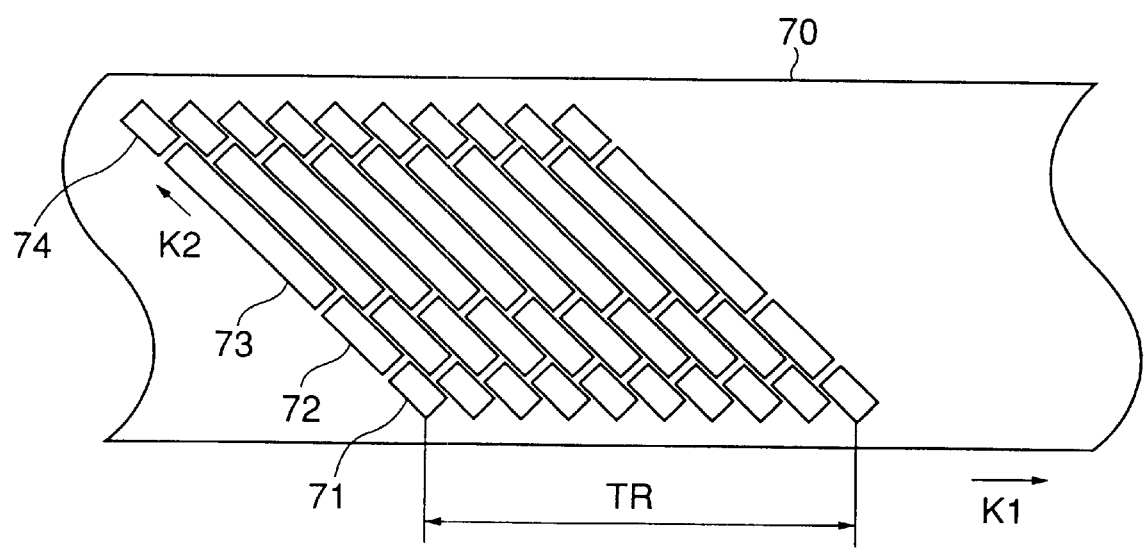
FIG. 2 is a diagram schematically showing how data are recorded onto a DVC in the first embodiment.

Data recording onto the recording medium 3 will be described. FIG. 2 shows a data recording condition on a video tape (magnetic tape) 70 of the DVC. Arrow K1 represents the direction in which the tape 70 runs. Arrow K2 represents the scanning direction of the head C26 (see FIG. 20). The track has an ITI sector 71 on which a reference signal, etc. is recorded, an audio sector 72 on which an audio signal, etc. is recorded, a video sector 73 on which a video signal, etc. is recorded and a sub-code sector 74 on which a head search signal, etc. is recorded. These signals are recorded in a digital format.

The NTSC (National Television System Committee) system employs a pattern in which one frame is recorded by use of ten tracks in the range shown by arrow TR. On the sub-code sector 74, a time code assigned for every field, date and time are recorded as the norm. In addition, various information (e.g. simultaneous shooting information and the identification number of the silver-halide film, etc.) can be recorded.

Next, shooting in the silver-halide film shooting mode ($P_H$) will be described. By setting the operation mode changeover switch at the position of $P_H$, the camera-side microcomputer C01 sets operation buttons so as to be ready for the silver-halide film shooting mode ($P_H$). Simultaneously therewith, the camera-side microcomputer C01 and the lens-side microcomputer L06 perform communication to transmit lens information to the camera-side microcomputer C01, so that the video shooting section, the video signal recording and reproducing section and the EVF C27 are activated.

By pressing the release button, the aperture stop L11 and the shutter C07 are controlled under set shooting conditions to perform silver-halide film shooting. When the silver-halide film shooting is completed, the film feed controller C09 of the silver-halide film shooting section advances the film 4 by one frame. At this time, shooting conditions and information are recorded on the magnetic track 4f of the film 4.

Simultaneously with the shooting, in the video signal recording and reproducing section, a video signal of a timing substantially the same as the shooting timing is recorded in an image memory in the image signal processor C24 and after the recording medium 3 is placed in a recordable state, the video signal together with information outputted from the microcomputer C01 is recorded on the medium 3 as a still image. The shooting information is recorded on the sub-code sector 74 of the medium 3 in FIG. 2. Examples of contents of the information recorded on the film 4 and the recording medium 3 are shown in FIG. 7.

In the silver-halide film shooting information shown in FIG. 7, the first data is the shooting date of the frame and the second data is the shooting time thereof. The third data is simultaneous shooting information which indicates whether video shooting and silver-halide film shooting are performed simultaneously or not. The area for the fourth data is unused.

The fifth data is film top-to-bottom direction information for determining the top-to-bottom direction of the image. The sixth data is a print aspect ratio which is information for specifying the aspect ratio when a silver-halide film image is reproduced. The print aspect ratio comprises, for example, three kinds of H (height:width=9:16), C (height:width=2:3) and P (height:width=1:3). In the imaging portion 4g (see FIG. 3), reproduction areas of various aspect ratios are set.

The seventh data is a continuous scene which is information related to a series of scenes shot in a continuous shooting mode of a silver-halide film camera. The eighth data is a frame title representing the title of an exposed frame. The ninth data is a film title representing the title of the film 4. The tenth data is a camera identification code for identifying the camera used for shooting.

In the video shooting information, the first data is the shooting date, the second data is the shooting time and the third data is the simultaneous shooting information. The fourth data is frame link information. The frame link information related to a link between video images is information related to a group of continuously shot images and handles images in block. Specifically, the frame link information includes the shooting start time, the shooting end time and the shooting time period that has elapsed therebetween.

Next, shooting in the simultaneous shooting mode ($P_M$) will be described. By placing the operation changeover switch at the position of $P_M$, the camera-side microcomputer C01 sets the operation buttons so as to be ready for the simultaneous shooting mode ($P_M$). Simultaneously therewith, the camera-side microcomputer C01 and the lens-side microcomputer L06 perform communication to transmit the lens information to the camera-side microcomputer C01.

Then, the focus detector C02 and the brightness detector C12 are activated, AE (automatic exposure control) and AF (automatic focusing) operations are performed, the video shooting section, the video signal recording and reproducing section and the EVF C27 are activated and a subject image captured by the taking lens is displayed on the EVF C27. By the user operating the recording ON/OFF button while viewing a subject on the EVF C27, recording of moving images onto the recording medium is started.

When the release button is half depressed under the moving image recording state, shooting conditions are set based on the lens information and set information. When the release button is fully depressed, the aperture stop L11 and the shutter C07 are controlled under the set shooting conditions to perform silver-halide film shooting. When the silver-halide film shooting is completed, the film feed controller C09 of the silver-halide film shooting section advances the film 4 by one frame. At this time, the shooting conditions and information at that time are recorded onto the magnetic track 4f of one frame of the film 4.

Simultaneously with the shooting, in the video signal recording and reproducing section, an image signal of a timing substantially the same as the shooting timing is recorded together with information (FIG. 7) outputted from the camera-side microcomputer C01. Moreover, in the simultaneous shooting, the image shooting apparatus may record the identification number of the recording medium 3 onto the silver-halide film 4 and record the identification number of the silver-halide film 4 and the frame number onto the recording medium 3.

During video recording standby in the simultaneous shooting mode ($P_M$), recording by operating the release button when the recording of moving images is not performed is similar to that of the silver-halide film shooting mode ($P_H$)

In the video shooting mode ($M_V$), only video shooting can be performed. In the video reproduction mode (V), images recorded on the recording medium 3 are reproduced and displayed on the EVF C27. In the edit mode (E), shooting information recorded on the film 4 is read out and displayed on the EVF C27 as index information. In addition, information such as the print aspect ratio (FIG. 7) may be changed.

Figure 1:
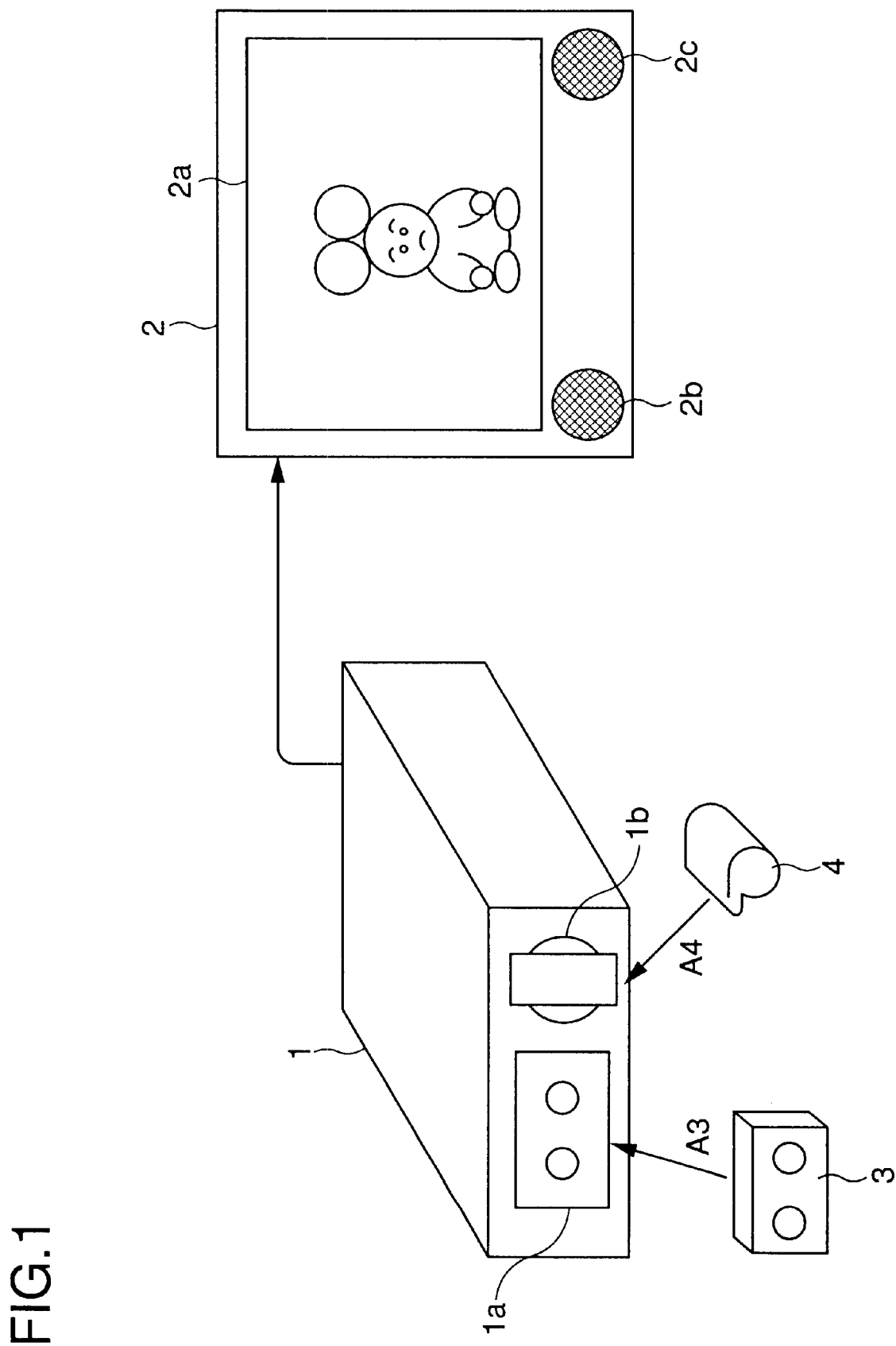
FIG. 1 is a diagram showing the system configuration of a first embodiment of the invention.

Next, the image reproducing apparatus 1 will be described for reproducing images from the film 4 and the video tape 3 shot by the image shooting apparatus (FIG. 20). FIG. 1 shows the system construction of the image reproducing apparatus 1. The image reproducing apparatus 1 has an opening 1a for loading the DVC (video image recording medium) 3 and an opening 1b for loading the silver-halide film (silver-halide film recording medium) 4. The DVC 3 is loaded into the opening 1a as shown by arrow A3. The silver-halide film 4 is loaded into the opening 1b as shown by arrow A4.

The image reproducing apparatus 1 reads video images and video shooting information from the DVC 3 loaded in the opening 1a, and is also capable of writing images and video shooting information onto the DVC 3. The image reproducing apparatus 1 reads silver-halide film images and silver-halide film shooting information from the silver-halide film 4 loaded in the opening 1b, and is capable of writing shooting information onto the silver-halide film 4 as described later.

From the image reproducing apparatus 1, signals representative of shot video and audio are transmitted to a monitor apparatus 2 such as a TV (television) set. The monitor apparatus 2 has a display screen portion 2a such as a cathode-ray tube and speakers 2b and 2c. On the display screen portion 2a, video images transmitted from the image reproducing apparatus 1 are displayed. The speakers 2b and 2c acoustically outputs the transmitted audio signals.

Figure 4:
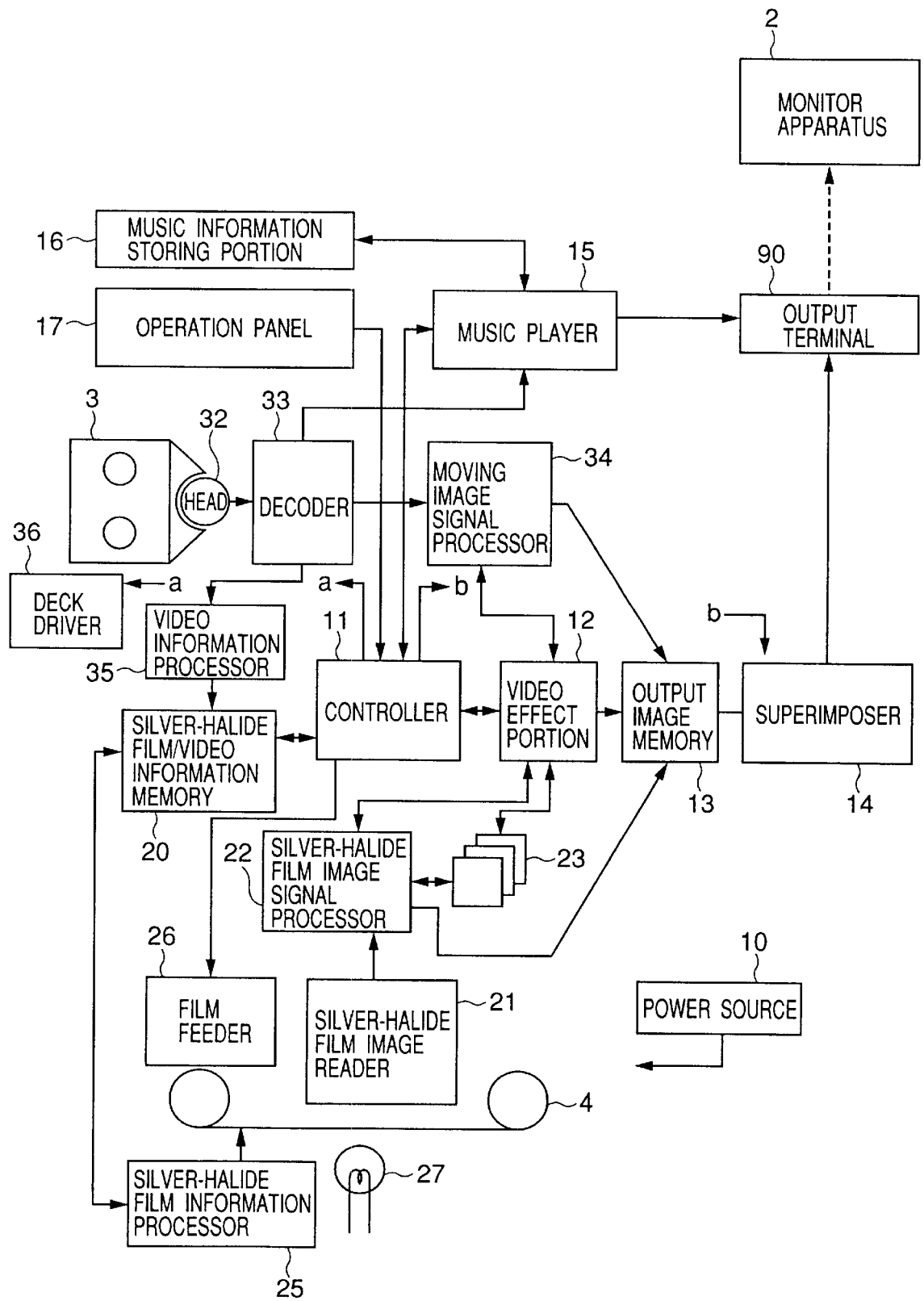
FIG. 4 is a block diagram of the image reproducing apparatus of the first embodiment.

FIG. 4 is a block diagram of the image reproducing apparatus 1 of this embodiment. A controller 11 controls various portions of the image reproducing apparatus 1 (see FIG. 1) and includes a microcomputer. A film feeder 26 has a motor, and advances and rewinds the fully exposed film 4 to the position of an image to be read out by being controlled by the controller 11.

A silver-halide film information processor 25 has a magnetic head, and reads silver-halide film shooting information recorded on the silver-halide film 4 and writes information onto the silver-halide film 4. The silver-halide film shooting information being read out is stored in a silver-halide film information/video information memory 20.

A light source 27 comprises, for example, a light bulb or a fluorescent lamp. By the light source 27 illuminating the film 4, silver-halide film images on the film 4 are read out by a silver-halide film image reader 21. A silver-halide film image signal processor 22 performs γ conversion and Y/C separation, etc. of the image data read out by the silver-halide film image reader 21. A silver-halide film image memory 23 stores the processed image data therein.

A deck driver 36 has a motor, and drives the DVC 3 by being controlled by the controller 11. Then, data recorded on the DVC 3 are read out by a head 32 and decoded by a decoder 33, so that the video signal is transmitted to a moving image signal processor 34, the audio signal, to a music player 15 and the video shooting information, to a video information processor 35. In the video information processor 35, of the data of the video shooting information, data necessary for subsequently-described block division is stored in the video information memory 20.

In the moving image signal processor 34, the compressed moving image signal is decompressed and a synchronizing signal, etc. is added thereto to form a Y/C signal. The signal processed by the moving signal processor 34 and the signal processed by the silver-halide film image signal processor 22 are temporarily stored in an output image memory 13. Then, a superimposer 14 superimposes information such as date information and title information transmitted from the controller 11 on the image signal. Then, the image signal is outputted to the monitor apparatus 2 via an output terminal 90.

An operation panel 17 has various input switches such as a power switch, a reproduction start/stop switch, a reproduction mode selection switch, a music selection switch, an image rotation switch and a pause switch.

Image reproduction methods such as image scrolling, rotation and pause, image switching such as overlap, fade-in and fade-out, and a simultaneous reproduction method are performed by controlling the output image memory 13 with a video effect portion 12. In a music information storing portion 16, music and audio signals are stored. The music player 15 controls audio signals from the music information storing portion 16 and the decoder 13 and outputs them from the output terminal 90 to the monitor apparatus 2. A power source 10 supplies power to each portion.

Next, a processing of this embodiment is briefly shown in FIGS. 5A and 5B and will be described with reference to the block diagram shown in FIG. 4. FIG. 5A shows a basic sequence thereof. FIG. 5B shows a variation thereof. When the process starts, at step #1, video shooting information and silver-halide film shooting information are read out from the DVC 3 and the silver-halide film 4, respectively, and are stored in the memory 20. Then, the process proceeds to step #2 to detect the selected mode based on an input from the operation panel 17. Then, the process proceeds to step #3 to perform block division through a predetermined processing based on the detected selected mode.

Then, the process proceeds to step #4. At step #4, a play method (including reproduction method) is decided based on the play time specified by operation of the operation panel 17 and the result of the block division. Then, the process proceeds to step #5 to perform automatic playing according to the decided play method. When the playing is finished, the process proceeds to step #6 to rewind the DVC 3 and the silver-halide film 4. Then, the DVC 3 and the silver-halide film 4 are ejected from the image reproducing apparatus 1 (see FIG. 1) and the process ends.

FIG. 5B shows a variation of the above-described processing. Steps the same as those of FIG. 5A are denoted by the same numerals and will not be described. Between the rewinding step (#6) and the ejection step (#7), information writing step (#8) is inserted in which information stored in the silver-halide film information/video information memory 20 is written to a head of the DVC 3 and to the leader area 4a (see FIG. 3) of the silver-halide film 4. With this step, when the process starts again, it is necessary to read information only from the head of the DVC 3 and the leader area 4a of the silver-halide film 4 in the information readout step (#1), so that the processing speed improves.

The information readout step (#1) will be described in detail with reference to FIG. 6. When the process starts, at step #11, the image reproducing apparatus 1 (see FIG. 1) is turned on. When the controller 11 is activated, first, whether the DVC 3 is loaded or not is determined at step #12. When the DVC 3 is not loaded, the process proceeds to step #13 to control the superimposer 14 so that a message to prompt the user to load the DVC 3 is displayed on the monitor apparatus 2. Then, the process returns to step #12. When the DVC is loaded at step #12, the process proceeds to step #14.

At step #14, whether the silver-halide film 4 is loaded or not is determined. When the film 4 is not loaded, the process proceeds to step #15 to control the superimposer 14 so that a message to prompt the user to load the film 4 is displayed on the monitor apparatus 2. Then, the process returns to step #14. When the silver-halide film 4 is loaded at step #14, the process proceeds to step #16.

At step #16, the controller 11 directs the film feeder 26 to advance the silver-halide film 4 and reads all the silver-halide film shooting information recorded on the film 4. The controller 11 also directs the deck driver 36 to transport the DVC 3 at high speed and reads the sub-code sector 74 (see FIG. 2) while the DVC 3 is being fed at a high speed. Then, at step #17, the silver-halide film information read from the film 4 and the video shooting information outputted from the video information processor 35 are stored in the silver-halide film information/video information memory 20. The silver-halide film information/video information memory 20 has a memory capacity enough for storing information corresponding to at least one roll of film and one video cassette.

When silver-halide film shooting information is recorded on the leader area 4a (see FIG. 3) of the silver-halide film 4, the information is read out from the leader area 4a at step #16. Likewise, when video shooting information is recorded on the head of the DVC 3, the information is read from the head. The shooting information stored in the silver-halide film information/video information memory 20 is data shown in FIG. 7.

When the video shooting information and the silver-halide film shooting information are stored in the silver-halide film information/video information memory 20 at step #17, the process proceeds to step #20. At step #20, the controller 11 determines whether the silver-halide film shooting information and the video shooting information stored in the silver-halide film information/video information memory 20 coincide with each other in the shooting date, shooting time and simultaneous shooting information. Through this step, it is confirmed whether the DVC 3 and the silver-halide film 4 loaded in the image reproducing apparatus 1 (see FIG. 1) were simultaneously used or not.

When it is determined that the DVC 3 and the silver-halide film 4 were not simultaneously used because the two pieces of shooting information do not coincide with each other, the process proceeds to step #21 to control the superimposer 14 so that a message to change the DVC 3 or the silver-halide film 4 is displayed on the monitor apparatus 2. Then, the process returns to step #12. When it is determined at step #20 that the DVC 3 and the silver-halide film 4 were simultaneously used because the two pieces of information coincide with each other, the process proceeds to step #22 to detect which reproduction mode is selected by the user.

When a silver-halide film-weighted reproduction mode is selected, the process proceeds to step #23. When a video-weighted reproduction mode is selected, the process proceeds to step #24. When a digest mode is selected, the process proceeds to step #25. When the edit mode is selected, the process proceeds to step #26. Then, the steps (#23 to #26) of these modes will be described.

Figure 8:
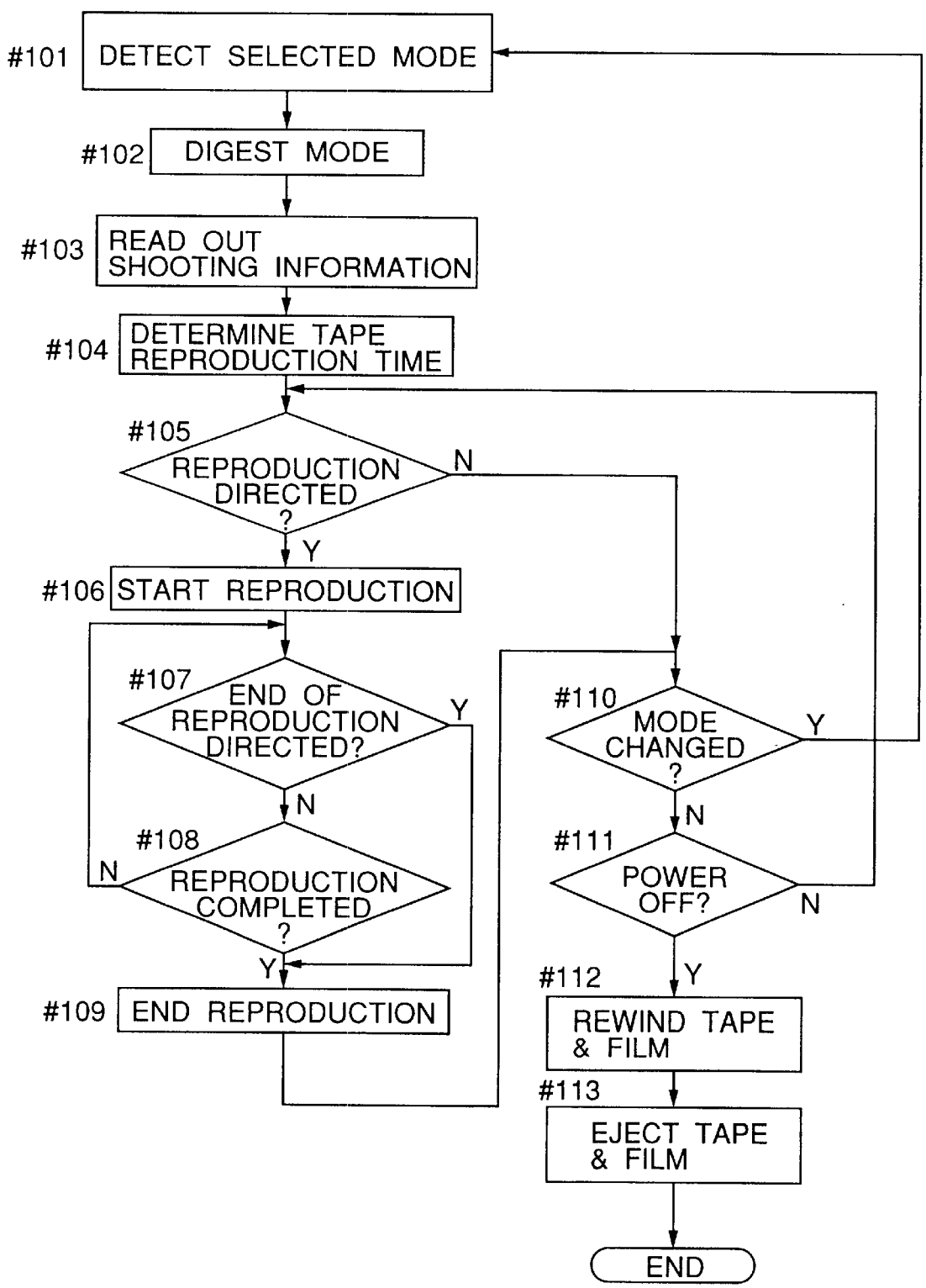
FIG. 8 is a flowchart of the operation sequence in the digest mode in the first embodiment.

First, the digest mode will be described. FIG. 8 shows a flowchart of the digest mode. When the digest mode is selected in the selected mode detection step (#101), the process proceeds to step #102. Then, at step #103, the controller 11 reads out the silver-halide film shooting information and the video shooting information stored in the silver-halide film information/video information memory 20. The information read out at this step is the first to fourth data shown in FIG. 7.

Figure 9:
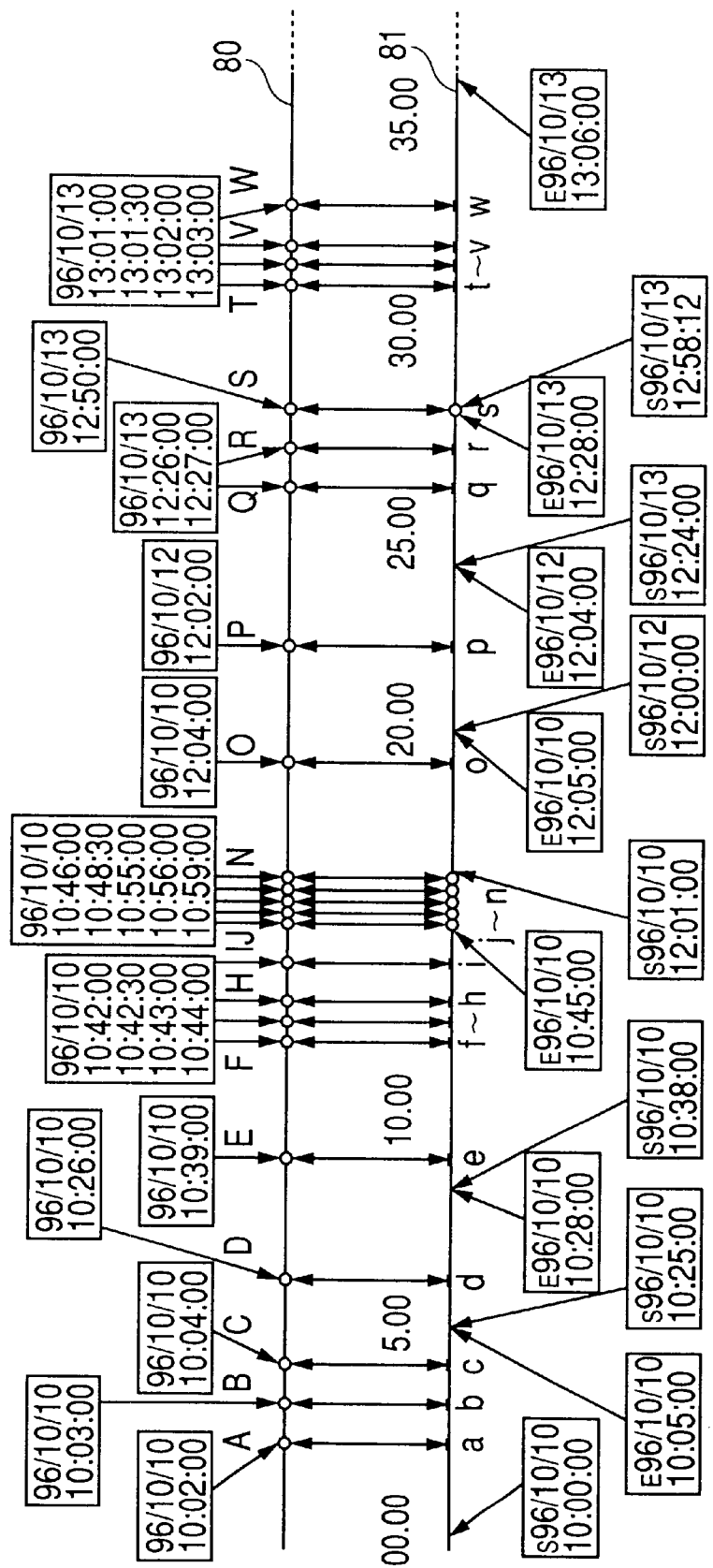
FIG. 9 is a time chart of a reproduction sequence in the digest mode in the first embodiment.

Then, based on the information being read out, for example, a time chart representing shooting conditions as shown in FIG. 9 is produced in the controller 11. The upper lateral axis 80 represents silver-halide film shooting conditions and the lower lateral axis 81 represent video shooting conditions. The lateral axes 80 and 81 are based on the time code of the DVC 3. The time code is shown in increments of five minutes between the lateral axes 80 and 81.

On the lateral axis 80, the dates and times of silver-halide film shooting are shown at marks ○ denoted by A to W. On the lateral axis 81, video shooting start times and dates preceded by the letter S and video shooting end dates and times preceded by the letter E are shown. Marks ○ denoted by j to n and s on the lateral axis 81 represent images for confirmation of silver-halide film shooting. On the DVC 3, an image for confirmation is recorded in one frame or a still image is recorded for approximately one second.

In the digest mode, as the image for confirmation, the same image is reproduced for 12 seconds. Moreover, in the digest mode, the block division step (#3) of FIG. 5 is not performed and images are successively reproduced for 30 seconds, i.e. 15 seconds each before and after simultaneous shooting, and for the 12 seconds for the image for confirmation. Consequently, it is decided to successively reproduce the portions a to w on the lateral axis 81.

When the reproduction portions a to w are decided, at step #104 of FIG. 8, the tape reproduction time is determined. Then, the process proceeds to step #105 and the apparatus is placed in a standby state in which it is determined whether the user directs reproduction with the operation panel 17 (see FIG. 4) or not. When the user directs reproduction, the process proceeds to step #106 to start the reproduction of the portions a to w according to a decided reproduction order.

During the reproduction, whether the user directs end of the reproduction or not is determined at step #107. When the user directs end of the reproduction, the process proceeds to step #109. At step #109, the reproduction is ended. When the user does not direct end of the reproduction, the process proceeds to step #108. At step #108, it is determined whether the reproduction of the portions a to w has been completed or not. When the reproduction has been completed, the process proceeds to step #109. When the reproduction has not been completed, the process returns to step #107.

When the reproduction is ended at step #109, the process proceeds to step #110. When the user does not direct reproduction at step #105, the process proceeds directly to step #110. At step #110, it is determined whether or not the user has changed the mode by operating the operation panel 17 (see FIG. 4). When the mode has been changed, the process returns to step #101 to detect the selected mode and the processing is performed in the detected selected mode.

When the mode has not been changed at step #110, the process proceeds to step #111 to determine whether the power switch provided in the operation panel 17 has been turned off or not. When the power switch has not been turned off, the process returns to step #105 to determine whether user directs reproduction or not. When the power switch has been turned off, the process proceeds to step #112 to rewind the DVC 3 and the film 4. Then, the process proceeds to step #113 to eject the DVC 3 and the film 4 and the process ends.

In the variation shown in FIG. 5B, the step of recording information stored in the silver-halide film information/video information memory 20 onto the head of the DVC 3 and the leader area 4a (see FIG. 3) of the film 4 is inserted between steps #112 and #113. With this step, information is read out from the head of the DVC 3 and the leader area 4a of the film 4 during the next reproduction. Since it is unnecessary to read information from the whole of the DVC 3 and the film 4, the time is reduced that elapsed before the start of reproduction.

However, since the storage capacity of the silver-halide film information/video information memory 20 is limited, when information is newly read from several DVCs 3 and films 4, information is erased from older ones.

Figure 10:
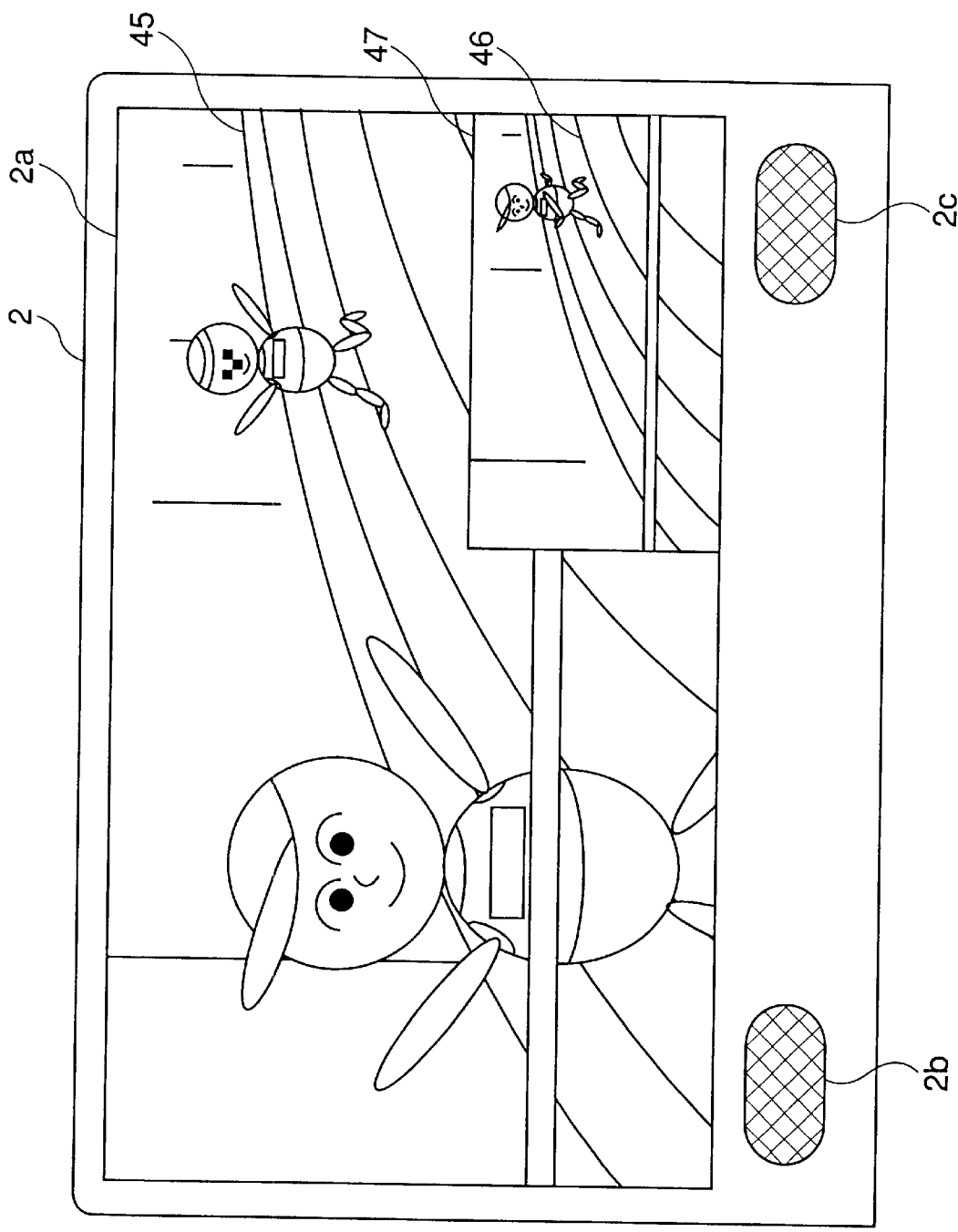
FIG. 10 is a diagram showing an example of simultaneous display of a still picture and a moving picture in the first embodiment.

While only a video image is reproduced in this embodiment, for example, as shown in FIG. 10, a still image may be read out from the film 4 by the silver-halide film image reader 21 (see FIG. 4) so that the still image and a moving image based on a video image are simultaneously reproduced on the display screen 2a of the monitor apparatus 2. In FIG. 10, portions the same as those of FIG. 1 are denoted by the same reference numerals and will not be described. The display screen 2a is divided by a partition line 47 into a section 45 where a moving image based on a video image is displayed and a section 46 where a still image is displayed. The sections for displaying the moving image and the still images may be reversed. The partition line 47 may be freely set.

In the case of simultaneous reproduction, when the video image portion a is reproduced, the still image A is simultaneously reproduced. Likewise, when the video image portions b to w are reproduced, the still image portions B to W are simultaneously reproduced, respectively. This is advantageous in image quality, particularly, when a high-image-quality monitor such as a high-definition television system is used.

When the silver-halide film image memory 23 (see FIG. 4) has somewhat sufficient memory capacity, still images read out by the silver-halide film image reader 21 are reproduced for the portions J to N and other still images are read out from the memory 23. With this, the time necessary for rewinding the film is reduced during reproduction even if the capacity of the memory 23 is not sufficient.

When silver-halide film images are reproduced, the top-to-bottom direction is read out from the top-to-bottom direction information (see FIG. 7) to decide the reproduction direction of the images. In the reproduction, the images are not necessarily reproduced for 30 seconds, i.e. 15 seconds each of before and after simultaneous shooting but may be reproduced for a shorter or a longer time. The time may be changed by the operation panel 17. The same applies to the images for confirmation. The audio outputted during image reproduction may be the one recorded on the DVC 3 or may be the one stored in the music information storing portion 16 (see FIG. 4). The selection therebetween may be performed by a music selection switch provided in the operation panel 17.

Figure 11:
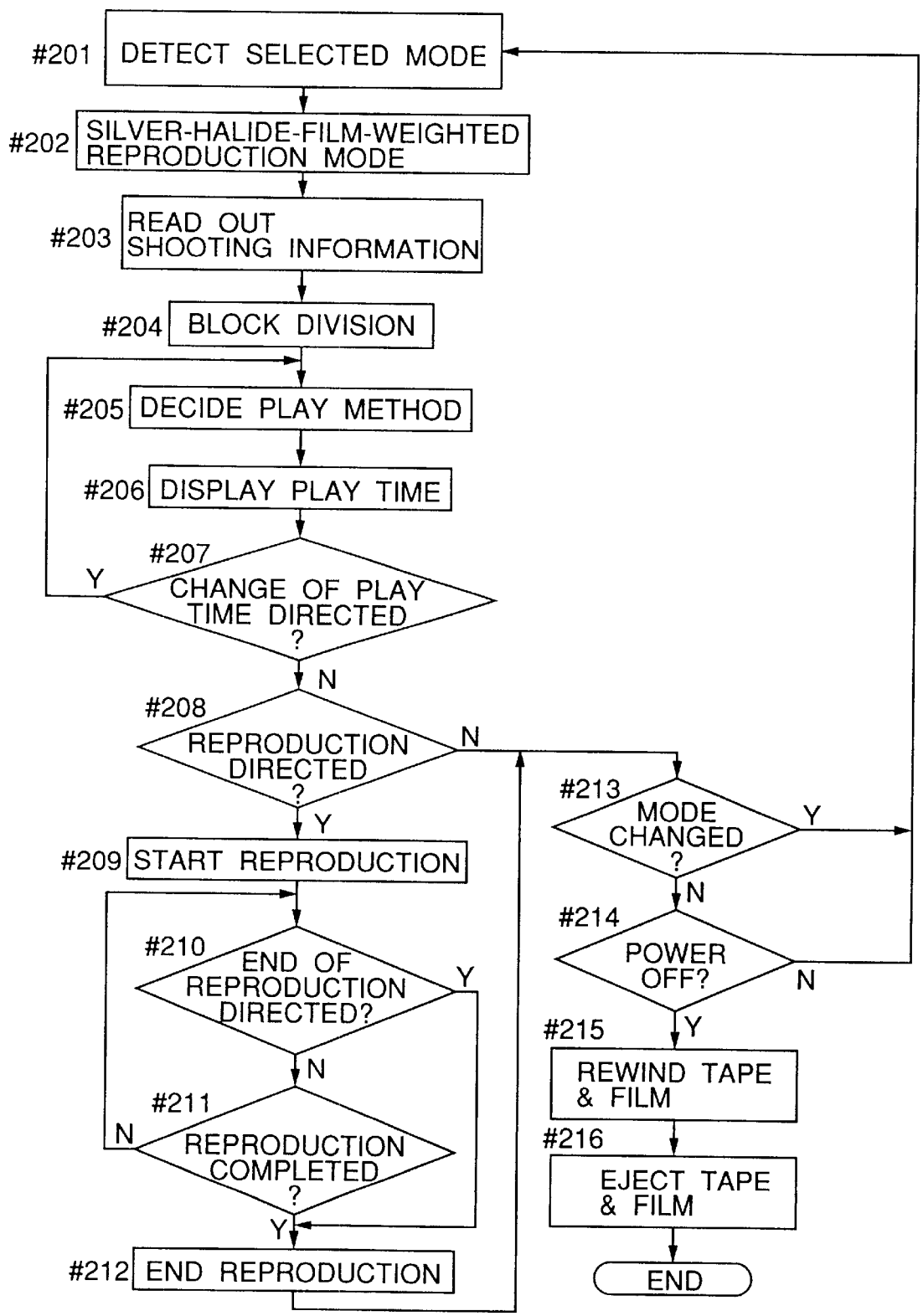
FIG. 11 is a flowchart showing the operation sequence in the silver-halide-picture-weighted reproduction mode in the first embodiment.

Next, the silver-halide film-weighted reproduction mode will be described. FIG. 11 is a flowchart of the processing of the silver-halide film-weighted reproduction mode. With respect to the mode selection, it is preferable that the silver-halide film-weighted reproduction mode should be the default. When the silver-halide film-weighted reproduction mode is selected in the selected mode detection step (#201), the process proceeds to step #202.

Figure 13:
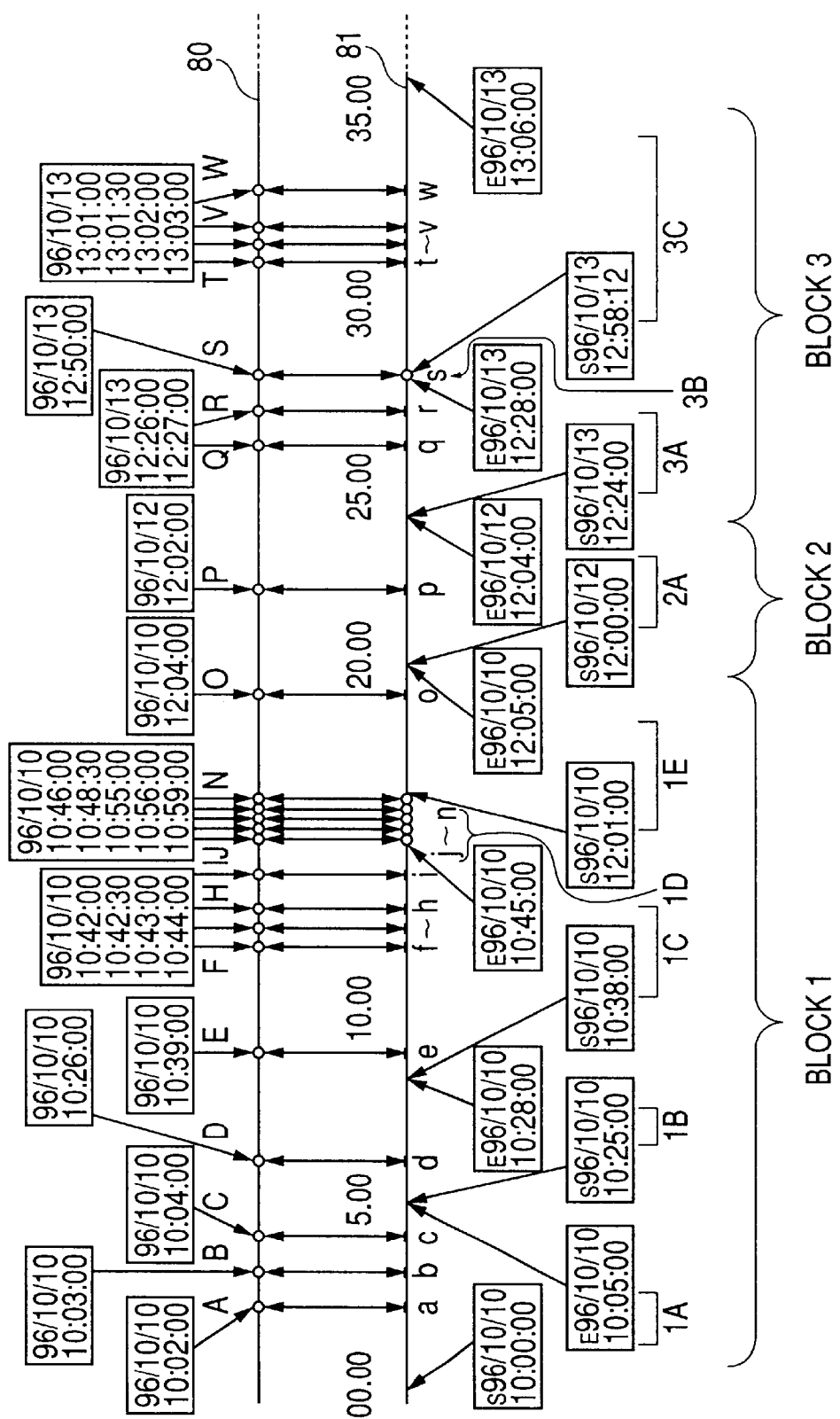
FIG. 13 is a time chart of a reproduction sequence in the silver-halide-picture-weighted reproduction mode in the first embodiment.

Then, at step #203, the controller 11 reads out silver-halide film shooting information and video shooting information from the silver-halide film information/video information memory 20 (see FIG. 4). The information read out at this step is the first to fourth data shown in FIG. 7. Based on the information being read out, in the controller 11, for example, a time chart as shown in FIG. 13 is produced. In FIG. 13, portions the same as those of FIG. 9 are denoted by the same reference designations and will not be described.

Figure 12:
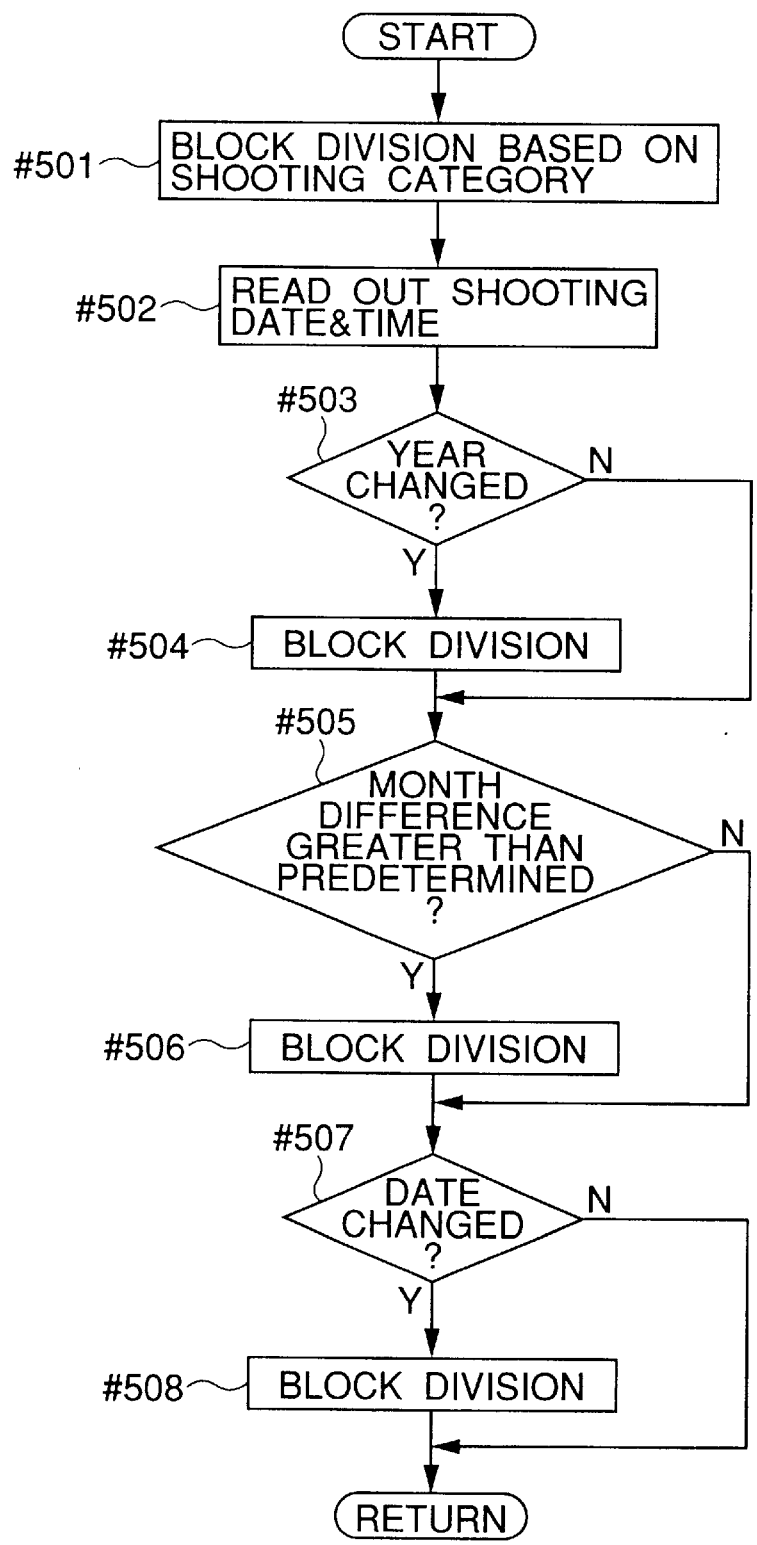
FIG. 12 is a flowchart showing the operation sequence for block division in the first embodiment.

Then, the process proceeds to step #204 to perform block division. FIG. 12 is a flowchart of the block division step (#204). When the block division is started, first, at step #501, image data is divided into the portion of video shooting and the portion of only silver-halide film shooting. The portion of the video shooting is divided into blocks divided based on the start of shooting (times and dates preceded by the letter S) and the end of shooting (times and dates preceded by the letter E). With this step, in FIG. 13, the portion is divided into blocks 1A, 1B, . . . , 3B and 3C.

Then, the blocks 1A to 3C are hierarchically subdivided. At step #502, shooting date information of each block is read out. Specifically, when a video shooting block is followed by a video shooting block, video shooting end and video shooting start date information is read out. When a video shooting block is followed by a silver-halide film shooting block, video shooting end and silver-halide film recording start date information is read out. When a silver-halide film shooting block is followed by a video shooting block, silver-halide film recording end and video shooting start date information is read out.

Then, at step #503, whether the year has changed or not is determined based on the date information being read out. When the year has changed, at step #504, the block is block-divided. Then, the process proceeds to step #505. When the year has not changed at step #503, the process proceeds to step #505.

Then, at step #505, whether or not the month difference between the blocks is a predetermined number of months or greater is determined. When the month difference is the predetermined number of months or greater, the process proceeds to step #506 to perform block division. Then, the process proceeds to step #507. When the month difference is not the predetermined number of months or greater, the process proceeds to step #507. The predetermined number of months is, for example when the month has changed from July to August, two considering that it is unnecessary to perform block division for the change from July 31 to August 1.

Then, whether the date has changed between the blocks is determined at step #507. When the date has changed, the process proceeds to step #508 to perform block division. Then, the process returns to the processing shown in FIG. 11. When the date has not changed, the process directly returns. For blocks of only silver-halide film shooting, the shooting date is read out for each frame and the block is subdivided through steps similar to steps #502 to #508. Thus, block division is hierarchically performed.

With these steps, in FIG. 13, the shooting portion is divided into blocks 1, 2 and 3. Then, the block 1 is subdivided into blocks 1A to 1E. The block 2 includes only a block 2A. The block 3 is subdivided into blocks 3A to 3C.

FIG. 14 shows the block division in a table format. In FIGS. 13 and 14, the blocks 1D and 3B are silver-halide film shooting blocks which are not subdivided. The video shooting time (C) at that time is regarded as 12 seconds for shooting of one frame.

Returning to FIG. 11, when the block division is performed at step #204, the process proceeds to step #205. At step #205, a play method is decided for each block according to a predetermined method (described later). To decide the play method, first, as shown in FIG. 14, the weight (A) of play is decided in decreasing order of ratio of number of exposed frames of the silver-halide film for the blocks 1, 2 and 3.

Then, for the blocks 1A to 1E, from the video shooting time (C) and the number (D) of exposed frames of the silver-halide film, the ratio of the video shooting time to the number of exposed frames of the silver-halide film (C/D) is obtained and the weight (B) of play is decided in increasing order of the value thereof. With this step, the weights (A) and (B) of play reflect the degree of the user's eagerness to keep the image not only as a video image but also as a silver-halide film image.

Methods of reproducing blocks of high weights (A) and (B) of play include the following:

1. In the case of silver-halide film shooting blocks,
   (a) the reproduction time for one frame is increased, or
   (b) reproduction with great effects is performed such as zooming in which an image is continuously enlarged or reduced or panning in which an image is continuously displayed from the end to end in the horizontal direction;
2. In the case of video shooting blocks,
   (a) reproduction is performed for all the video shooting time, or
   (b) video images before and after the silver-halide film shooting time are reproduced as long as possible.

Methods of reproducing blocks of low weights (A) and (B) of play include the following:

1. In the case of silver-halide film shooting blocks,
   (a) the shooting time for one frame is reduced or it is all right to reproduce the video image thereof for a short time, or
   (b) effects such as zooming and panning are not used;
2. In the case of video shooting blocks,
   (a) only a small portion at the start of recording or before and after the silver-halide film shooting time is reproduced, or
   (b) video images before and after the silver-halide film shooting time are reproduced as short as possible.

The play method is thus decided. Further, by using the fact that the blocks are hierarchically subdivided, commonality may be provided for the play of the blocks. When the play method is decided, the process proceeds to step #206 to display the play time on the monitor apparatus 2. Then, the process proceeds to step #207 to determine whether the user directs change of the play time or not. When the user directs change of the play time, the process returns to step #205. Then, at step #205, the play method is re-decided. For example, when the displayed play time is 10 minutes and the user directs to reduce the play time, the play method for each block is changed with the block division being maintained, thereby reducing the play time.

When the user does not direct change of the play time at step #207, the process proceeds to step #208. At step #208, the apparatus is placed in a standby state in which it is determined whether the user directs reproduction or not.

When the user directs reproduction, the process proceeds to step #209 to start reproduction of the blocks 1A to 3C according to the play method decided at step #205. During the reproduction, it is determined whether the user directs end of the reproduction or not.

When the user directs end of the reproduction, the process proceeds to step #212 to end the reproduction. When the user does not direct end of the reproduction, the process proceeds to step #211. At step #211, it is determined whether the reproduction of the blocks 1A to 3C has been completed or not. When the reproduction has been completed, the process proceeds to step #212. When the reproduction has not been completed the process returns to step #210.

When the reproduction is ended at step #212, the process proceeds to step #213. When the user does not direct reproduction at step #208, the process proceeds directly to step #213. At step #213, it is determined whether or not the user has changed the mode by operating the operation panel 17. When the mode has been changed, the process returns to step #201 to detect the selected mode. Then, the processing is performed in the selected mode.

When the mode has not been changed at step #213, the process proceeds to step #214 to determine whether the power switch provided in the operation panel 17 has been turned off or not. When the power switch has not been turned off, the process returns to step #201. When the power switch has been turned off at step #214, the process proceeds to step #215 to rewind the DVC 3 and the film 4. Then, the process proceeds to step #216 to eject the DVC 3 and the film 4 and the process ends.

In the variation shown in FIG. 5B, the step of recording information stored in the silver-halide film information/video information memory 20 onto the head of the DVC 3 and the leader area 4a (see FIG. 3) of the film 4 is inserted between steps #215 and #216.

Figure 15:
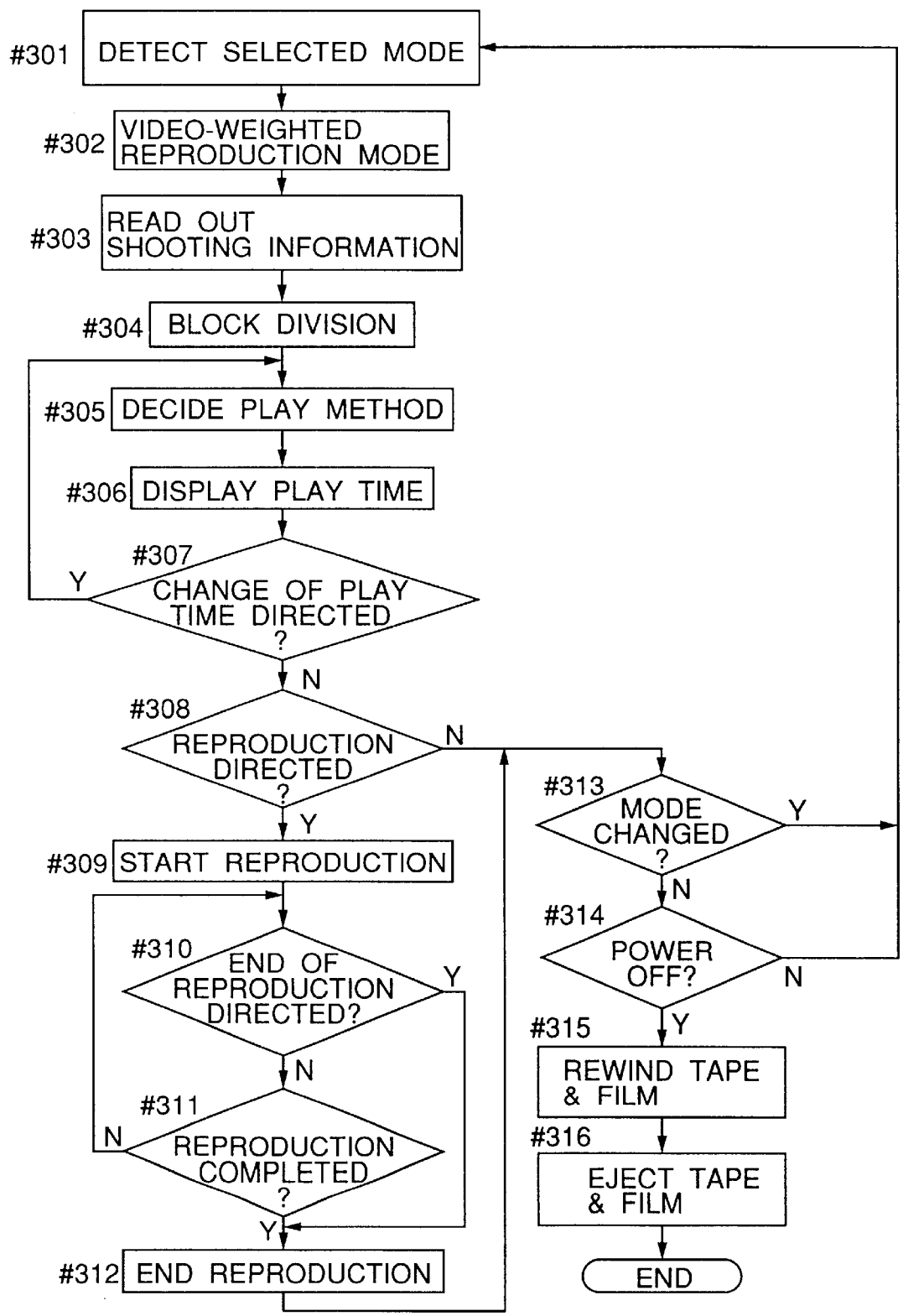
FIG. 15 is a flowchart showing the operation sequence in the video-weighted reproduction mode in the first embodiment.
Figure 16:
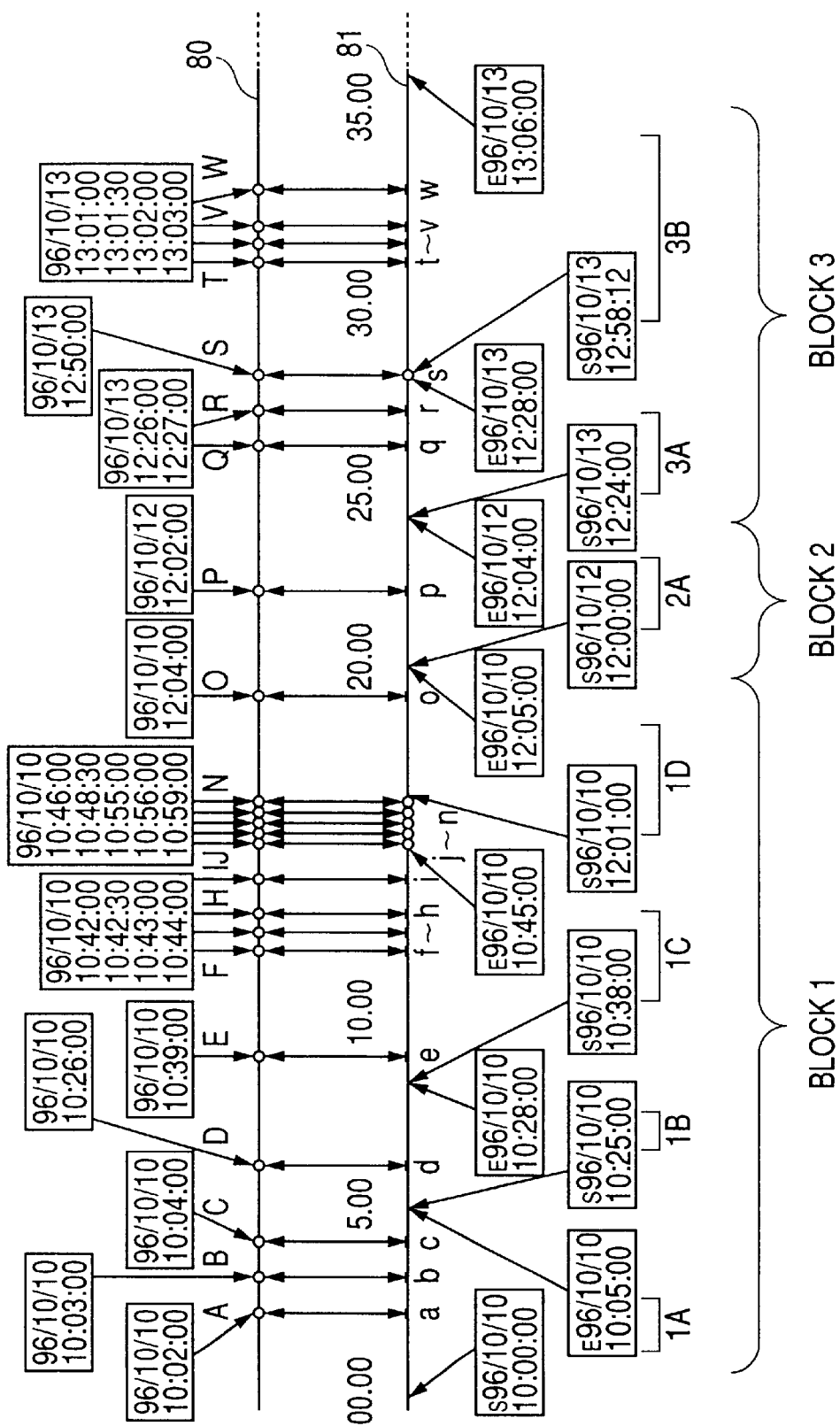
FIG. 16 is a time chart of a reproduction sequence in the video-weighted reproduction mode in the first embodiment.

Next, the video-weighted reproduction mode will be described. FIG. 15 is a flowchart of processing of the video-weighted reproduction mode. When the video-weighted reproduction mode is selected in the selected mode detection step (#301), the process proceeds to step #302. Then, at step #303, the controller 11 reads out silver-halide film shooting information and video shooting information. The information read out at this step is the first to fourth data shown in FIG. 7. Based on the information being read out, in the controller 11, for example, a time chart as shown in FIG. 16 is produced. In FIG. 16, portions the same as those of FIG. 9 are denoted by the same reference designations and will not be described.

Then, the process proceeds to step #304 to perform block division. The block division is performed through the processing of the flowchart shown in FIG. 12. However, blocks of only silver-halide film shooting are excluded from the blocks to be reproduced. With this step, the shooting portion is divided into blocks 1, 2 and 3. The block 1 is subdivided into blocks 1A to 1D. The block 2 includes only a block 2A. The block 3 is subdivided into blocks 3A to 3B. FIG. 17 shows the block division in a table format.

In FIG. 15, when block division is performed at step #304, the process proceeds to step #305. At step #305, the play method is decided for each block according to a predetermined method (described later). To decide the play method, as shown in FIG. 17, the weight (A) of play is decided in increasing order of the ratio of the video shooting time to the number of exposed frames of the silver-halide film (C/D) for the blocks 1, 2 and 3. The weights (A) of play of the blocks may be equal without being ranked.

For each of the blocks 1A to 3B, the ratio of the video shooting time to the number of exposed frames of the silver-halide film (C/D) is obtained and the weight (B) is decided in increasing order of the value thereof. With this, the weights (A) and (B) of play reflect the degree of the user's eagerness to keep the image not only as a video image but also as a silver-halide film image.

Methods of reproducing blocks of high weights (A) and (B) include:
(a) reproduction is performed for all the video shooting time; or
(b) video images at the start of shooting and before and after the silver-halide film shooting time are reproduced as long as possible.

Methods of reproducing blocks of low weights (A) and (B) include:
(a) only a small portion at the start of recording or before and after the silver-halide film shooting time is reproduced;
(b) video images before and after the silver-halide film shooting time are reproduced as short as possible; or
(c) a block where no silver-halide film shooting is performed is not reproduced.

The play method is thus decided. A play method in which the blocks 1, 2 and 3 are not weighted may be the default. When the play method is decided, the process proceeds to step #306 to display the play time on the monitor apparatus 2. Then, the process proceeds to step #307 to determine whether the user directs change of the play time or not. When the user directs change of the play time, the process proceeds to step #305. Then, at step #305, the play method is re-decided.

When the user does not direct change of the play time at step #307, the process proceeds to step #308. At step #308, it is determined whether the user directs reproduction or not. When the user directs reproduction, the process proceeds to step #309 to start the reproduction of the blocks 1A to 3C according to the play method decided at step #305. During the reproduction, whether the user directs end of the reproduction or not is determined at step #310.

When the user directs end of the reproduction, the process proceeds to step #312 to end the reproduction. When the user does not direct end of the reproduction, the process proceeds to step #311. At step #311, it is determined whether the reproduction of the blocks 1A to 3C has been completed or not. When the reproduction has been completed, the process proceeds to step #312. When the reproduction has not been completed, the process returns to step #310.

When the reproduction is ended at step #312, the process proceeds to step #313. When the user does not direct reproduction at step #308, the process proceeds to step #313. At step #313, when the user has changed the mode, the process returns to step #301 to detect the selected mode. Then, the processing is performed in the selected mode. When the mode has not been changed, the process proceeds to step #314 to determine whether the power switch provided in the operation panel 17 (see FIG. 4) has been turned off or not. When the power switch has not been turned off, the process returns to step #301.

When the power switch has been turned off, the process proceeds to step #315 to rewind the DVC 3 and the film 4. Then, the process proceeds to step #316 to eject the DVC 3 and the film 4 and the process ends. In the variation shown in FIG. 5B, the step of recording information stored in the silver-halide film information/video information memory 20 onto the head of the DVC 3 and the leader area 4a (see FIG. 3) of the film 4 is inserted between steps #315 and #316.

Thus, video images are edited by methods which differ according to the mode and the topic portion is automatically reproduced in digest. In the video-weighted reproduction mode, the silver-halide film images recorded during video shooting are not reproduced. This results in representation and play in which the portion of a commemorative photo is omitted and the story line of the video images is emphasized.

Figure 6:
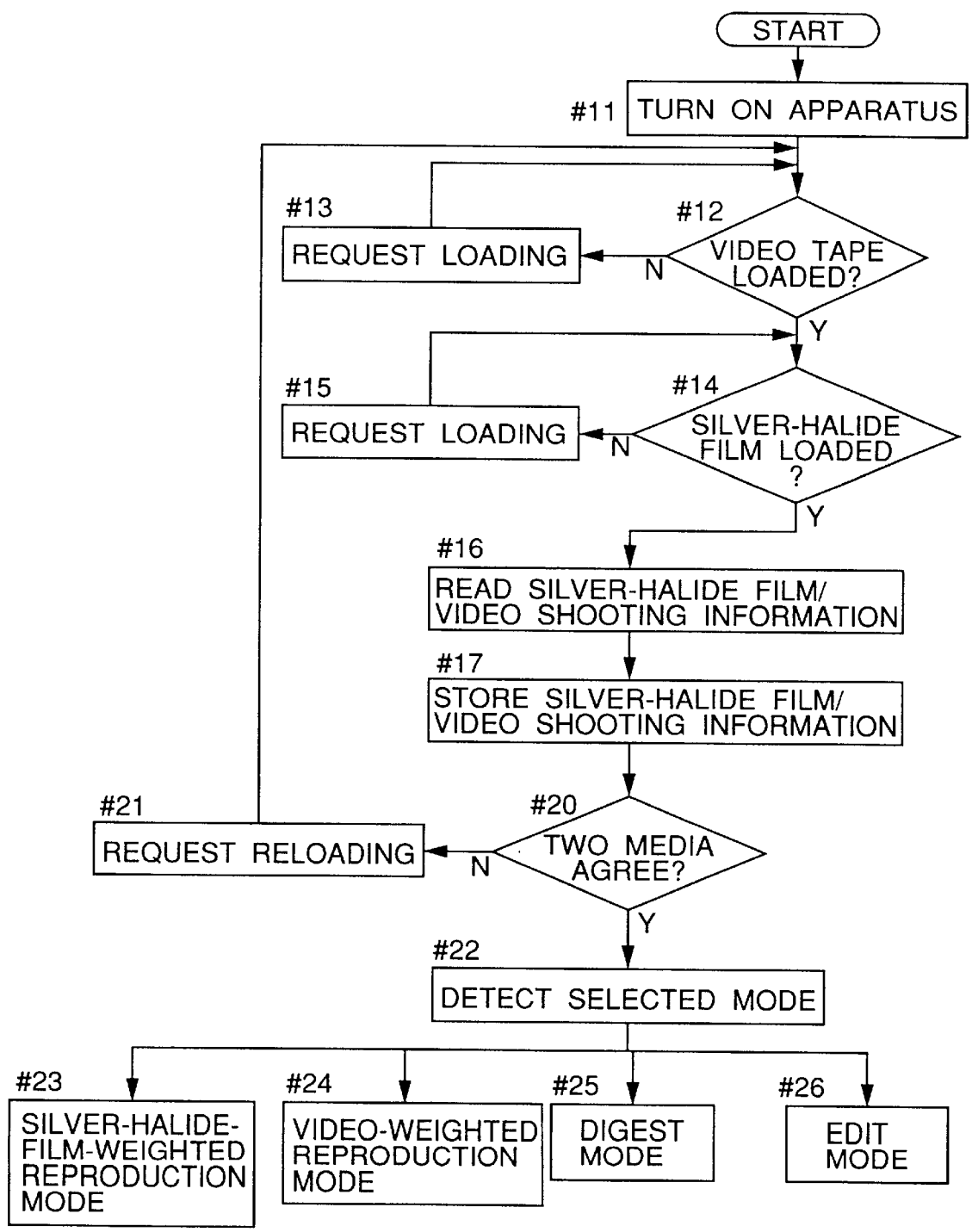
FIG. 6 is a flowchart showing the operation sequence for reading information in the first embodiment.

In FIG. 6, the edit mode step (#26) is a step of editing shot video images. In the edit mode step, it is convenient if means is provided for inputting detailed directions. For this reason, this step will be described in a second embodiment where detailed directions may be inputted.

According to this embodiment, by obtaining matching between different recording media such as the film 4 and the DVC 3, images are effectively viewed. Even when only one of the DVC 3 and the silver-halide film 4 is loaded, the image reproducing apparatus 1 is capable of reproducing it alone without editing it.

Second Embodiment

Figure 18:
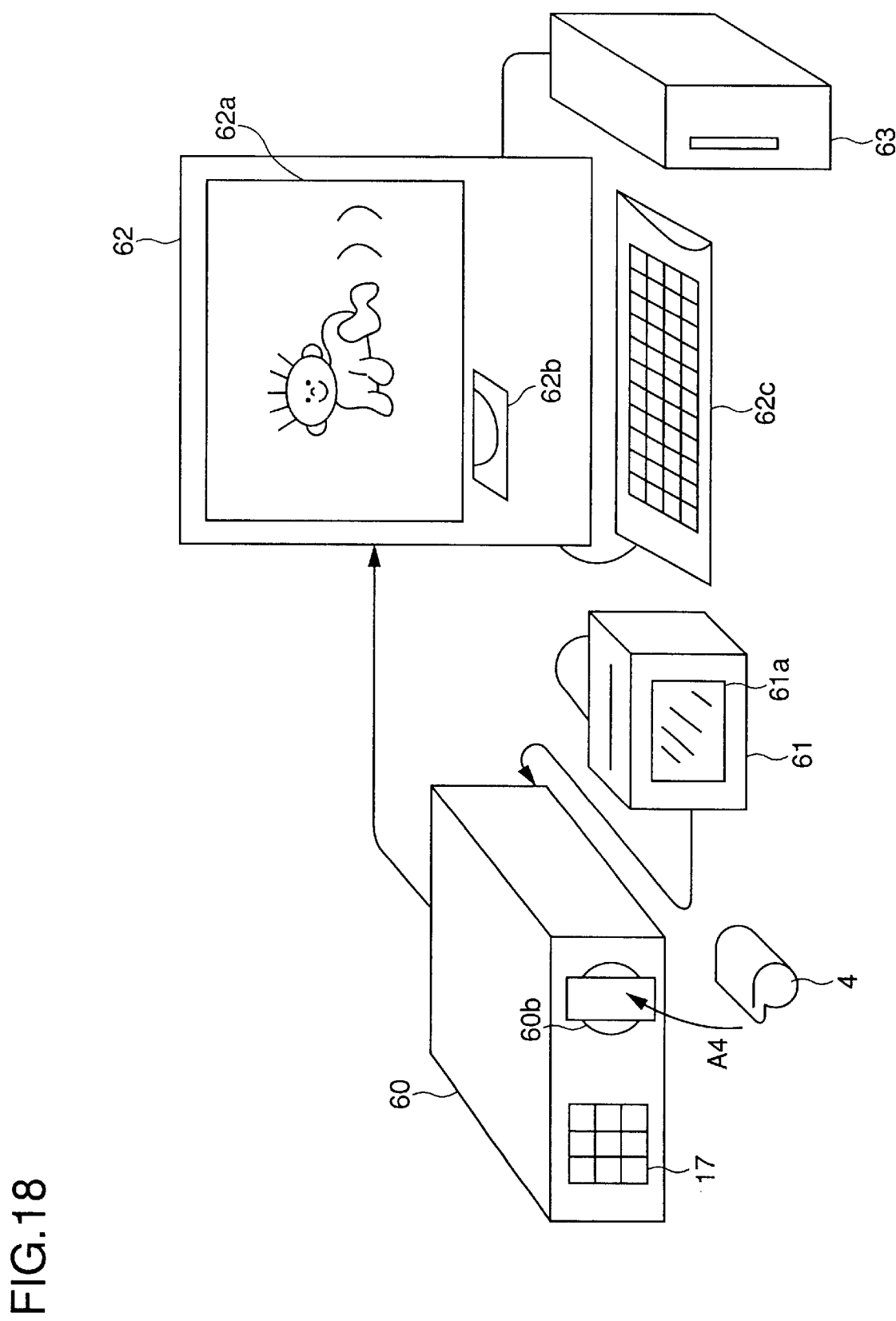
FIG. 18 is a diagram showing the system configuration of a second embodiment of the invention.

A second embodiment of the present invention will be described with reference to FIGS. 18 to 21. FIG. 18 shows the system construction of this embodiment. A film scanner 60 is an apparatus for reading out images from a silver-halide film 4 loaded in an opening 60b. The silver-halide film 4 is loaded as shown by arrow A4.

The film scanner 60 reads images and information from the silver-halide film 4 and outputs digital video and audio signals so that images are displayed on a personal computer (hereinafter, sometimes referred to as PC) 62, etc. The film scanner 60 is also capable of writing information onto the silver-halide film 4. The silver-halide film 4 is the silver-halide film 4 (FIG. 3) described in the first embodiment. On a front portion of the film scanner 60, an operation panel 17 is provided.

The film scanner 60 is capable of capturing video signals from a still camera 61 with a video camera and outputting the signals to the PC 62. The camera 61 is an image shooting apparatus (FIG. 20) capable of simultaneously performing silver-halide film shooting and video shooting. To record video images, for example, a DVC is used. The camera 61 displays the video images on a liquid crystal display plate 61a. The PC 62 has a monitor 62a for monitor display of images, a compact disc (CD) reproducing apparatus 62b for reproduction of music and voice and a keyboard 62c for input of detailed directions. For recording of video images, a magneto-optic disk recording apparatus (hereinafter, referred to as "MO") 63 is connected.

Figure 19:
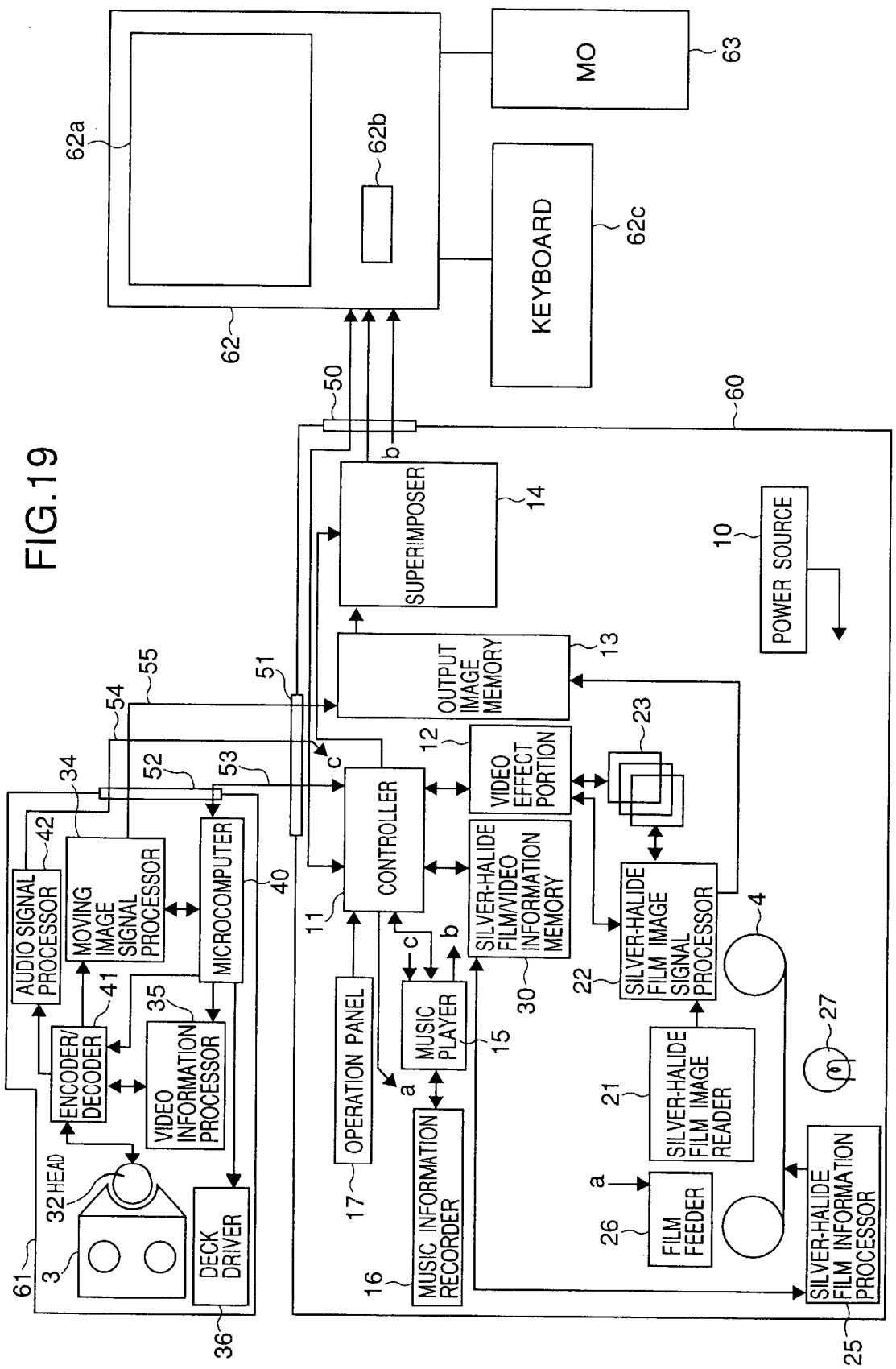
FIG. 19 is a block diagram of the second embodiment.

FIG. 19 is a block diagram showing the system control of this embodiment. FIG. 19 is basically the same as the block diagram (FIG. 4) of the first embodiment. For this reason, like portions are denoted by like reference numerals and will not be described. For the still camera 61 with a video camera, only a moving image reproduction system is shown and other systems such as a video recording system are not shown.

In FIG. 19, a microcomputer 40 is provided in the camera 61 to control the camera 61. The microcomputer 40 communicates with a controller 11 of the film scanner 60 through a connector 52, a control line 53 and a connector 51. Data recorded on a DVC 3 are read out by a head 32 and transmitted to an encoder/decoder 41 to be decoded.

From the encoder/decoder 41, video signals are sent to a moving signal processor 34. Video shooting information is sent to the video information processor 35. Audio signals are sent to an audio signal processor 34 to be processed. Moving image signals are sent from the moving signal processor 34 to an output image memory 13 of the film scanner 60 by way of the connector 52, a control line 55 and the connector 51. Audio signals are transmitted from the audio signal processor 42 to a music player 15 of the film scanner 60 by way of the connector 52, a control line 54 and the connector 51.

The controller 11 is connected to the PC 62 through a connector 50 and communicates with the PC 62. The music player 15 outputs audio signals to the PC 62 through the connector 50. A superimposer 14 outputs video signals to the PC 62 through the connector 50. To the PC 62, the MO 63 is connected and records images, etc. The PC 62 is provided with the CD (compact disk) reproducing apparatus 62b and is capable of reading data from CDs. During video image reproduction, music information may be read from a CD to output it. Key input is performed from the keyboard 62c.

The processing in the film scanner 60 includes a digest mode, a silver-halide film-weighted reproduction mode and a video-weighted reproduction mode. These modes are the same as those of the first embodiment and will not be described. In this embodiment, more detailed operations than in the first embodiment are enabled by the communication between the controller 11 and the PC 62 and operation of the keyboard 62c. By recording automatically-played images on the MO 63, processing is facilitated when automatic playing is performed again.

Next, the edit mode will be described. In FIG. 6, when the edit mode (#26) is selected at the selected mode detection step (#2), the controller 11 (see FIG. 19) reads out information stored in the silver-halide film information/video information memory 30. The information read out at this step is the first to fourth data shown in FIG. 7. Then, block division is performed by the same division method as that of the silver-halide film-weighted reproduction mode. With this, for example, a time chart as shown in FIGS. 13 or 14 is produced. The time chart of either FIG. 13 or FIG. 14 is displayed on the monitor 62a of the PC 62.

Figure 21:
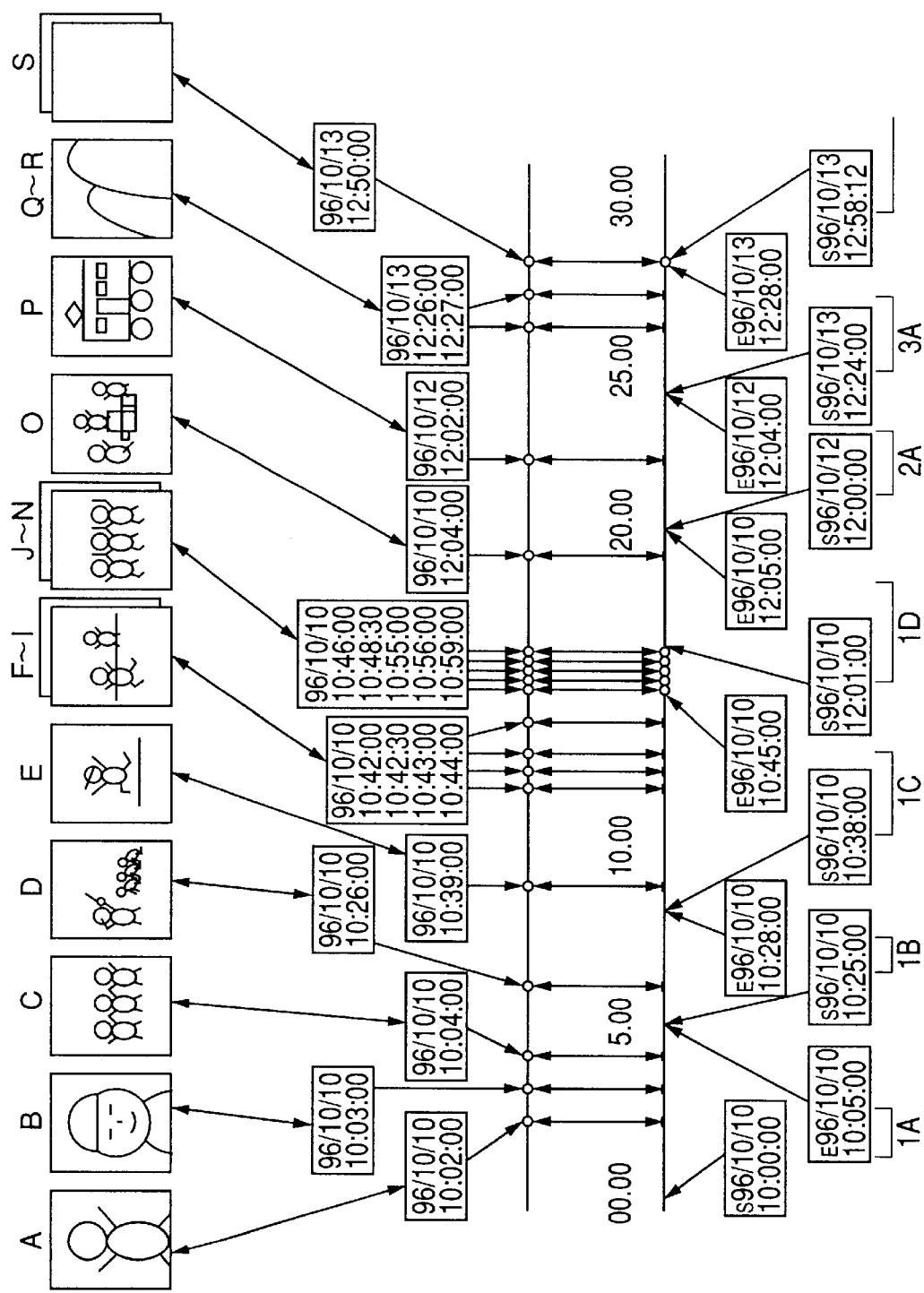
FIG. 21 is a diagram showing examples of images displayed on the screen in the edit mode in the second embodiment.

For example, images as shown in FIG. 21 are displayed. On the monitor 62a, sliver film shooting images A, B, . . . are also displayed. With this, the start and end of each shooting are clarified. Thus, by displaying silver-halide film shooting images as well, the sequence of images to be edited is known at a glance. In addition, the point and the topic portion, etc. are immediately understood. Actual editing is performed by use of edit software available in multiplicity for the PC 62.

Third Embodiment

A third embodiment of the present invention will be described with reference to FIGS. 2, 3, 7, 20, and 22 to 25. The image reproducing apparatus of this embodiment can present a slide show. This image reproducing apparatus, too, realizes effective viewing of pictures taken by an image shooting apparatus (FIG. 20) capable of simultaneous shooting, through matching of pictures shot on a silver-halide film with pictures shot on a video tape.

The image shooting apparatus used in the third embodiment is the same as the one used in the first embodiment and described earlier with reference to FIG. 20. Accordingly, no explanation will be repeated as to the image shooting apparatus.

Figure 22:
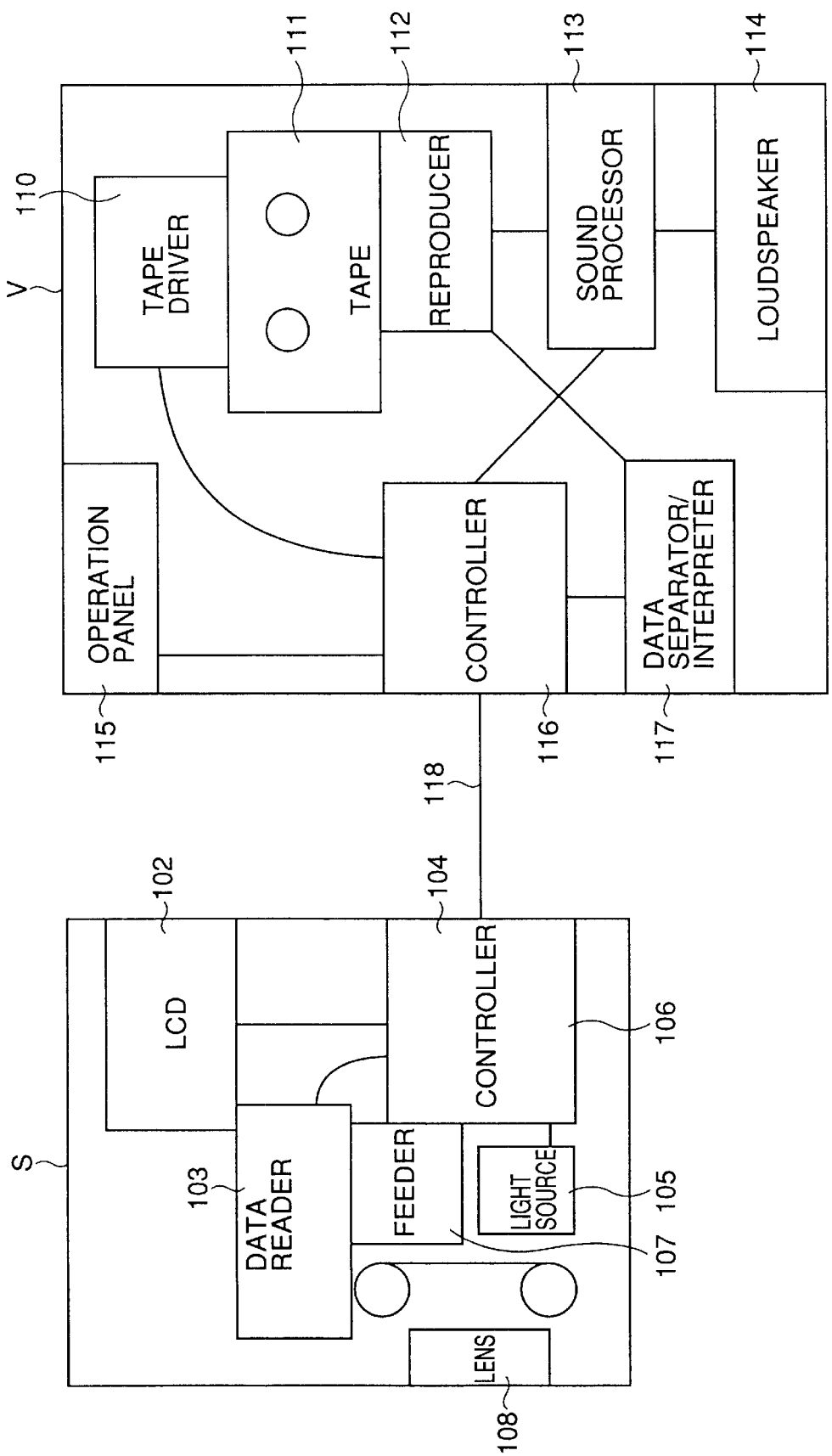
FIG. 22 is a diagram showing the system configuration of a third embodiment of the invention.

The image reproducing apparatus of the third embodiment is constructed and operates as follows. FIG. 22 is a block diagram showing the construction of the image reproducing apparatus. This image reproducing apparatus consists of a slide projector (silver-halide picture reproducing apparatus) S and a video reproducing apparatus V. The slide projector S is loaded with a reversal film 107 that has already gone through development. The film 107 is illuminated from its back by a light source 106, so that the light that has passed through the film 107 is directed through a lens 108 onto a screen (not shown) to form an image thereon. Here, the film 107 serves as a silver-halide picture recording medium (silver-halide film). The slide projector S is connected with the video reproducing apparatus V via a control line 118.

As the tape 111, a DVC or the like is used. When the image shooting apparatus (FIG. 20) performs silver-halide film shooting during video shooting, simultaneous shooting information is recorded, as part of usual shooting information, on the silver-halide film 107 and on the tape (video picture recording medium) 111. That is, as the film 107 and the video tape 111, those which have been used in the above-mentioned image shooting apparatus (FIG. 20) in actual shooting are used in the present image reproducing apparatus. Even when only silver-halide film shooting is performed, flags indicating that silver-halide film shooting has been performed are recorded on the video tape 111.

In the projector S, the controller 104 is a microcomputer that controls the entire slide projector S. The liquid crystal display (hereafter referred to as the "LCD") 102 displays messages sent from the controller 104. The data reader 103 has a magnetic head to read shooting information recorded on the film 107. The feeder 105 has a motor to feed the film 107. As the light source 106, an incandescent or fluorescent lamp, for example, is used.

The video reproducing apparatus V serves as a video sound outputting apparatus that, when loaded with a recorded tape 111, outputs the sounds recorded thereon. As the video picture recording medium, it is also possible to use, instead of a video tape 111, a disk, for example, on which sounds are recorded. The controller 116 is a microcomputer that controls the entire video reproducing apparatus V. The tape driver 110 has a motor to drive the tape 111. The reproducer 112 has a reading head to convert the magnetic signal recorded on the tape 111 into an electric signal.

The sound processor 113 converts the electric signal from the reproducer 112 into a video sound signal. From this video sound signal, the loudspeaker 114 reproduces sounds. The data separator/interpreter 117 separates the shooting information from the data read out by the reproducer 112 and interprets the information. On the operation panel 115, various switches, including the power switch, are arranged that are operated by the user. It is possible to use the above-mentioned image shooting apparatus (FIG. 20) itself as the video reproducing apparatus V.

Figure 23:
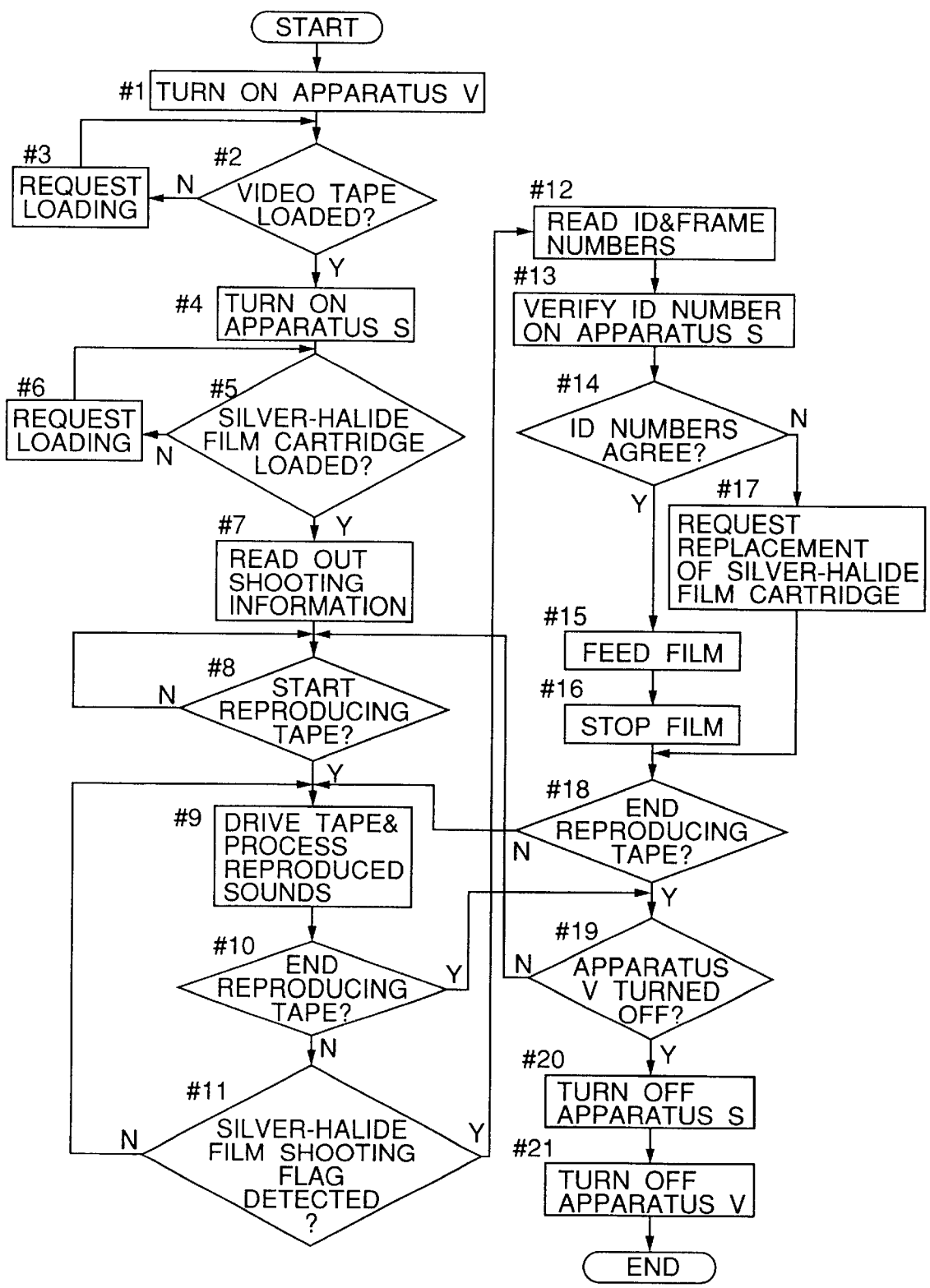
FIG. 23 is a flowchart showing the operation sequence of the third embodiment.

FIG. 23 is a flowchart showing the operation sequence of the image reproducing apparatus of this embodiment. When the power switch on the operation panel 115 is operated, the video reproducing apparatus V is turned on (#1). The controller 116 checks whether a tape 111 is loaded (#2); if not, it requests the loading of a tape (#3). For example, in a case where the video reproducing apparatus V is connected to a monitor device such as a television monitor, a message requesting the loading of a tape 111 is displayed on the monitor device by superimposing control. It is also possible to make the request with sound or voice. Thereafter, the operation sequence returns to step #2. If a tape 111 is loaded, the controller 116 turns on the slide projector S via the control line 118 (#4).

In the slide projector S, the controller 104 checks whether a silver-halide film cartridge 4c (see FIG. 3) is loaded (#5); if not, it controls the LCD 102 to display a message requesting the loading of a silver-halide film cartridge 4c (#6). Then, the operation sequence returns to step #5. If a silver-halide film cartridge 4c is loaded, the controller 104 feeds the film 107, and the data reader 103 reads in the shooting information recorded on the film 4 (#7). The shooting information includes information such as the camera identification code, the frame number, and the shooting direction (see FIG. 7).

Then, the image reproducing apparatus waits for the user to perform the operation for starting reproduction of the video tape 111 (#8). When the user performs the operation for starting reproduction, the controller 116 controls the tape driver 110 to drive the tape 111, controls the reproducer 112 and the sound processor 113 to reproduce the sounds recorded on the tape 111, and controls the loudspeaker 114 to output the reproduced sounds (#9).

Next, the image reproducing apparatus checks whether the user has performed the operation for ending reproduction of the tape 111 (#10). If the operation for ending reproduction has not been performed, the data separator/interpreter 117 checks whether a silver-halide film shooting flag (indicative also of simultaneous shooting) is detected (#11). If the flag is not detected, reproduction of the sounds recorded on the tape 111 is continued (#9). If the flag is detected, the identification number of the corresponding silver-halide film cartridge 4c and the frame numbers of the corresponding frames are interpreted (#12). Then, the controller 116 sends the identification number and the frame numbers to the slide projector S via the control line 118. The controller 104 checks the received identification number against the identification number included in the shooting information it read out in step #7 (#13).

The controller 104 checks whether the two identification numbers agree (#14). If they agree, the film 107 is fed to the position of the frame indicated by the received frame number (#15), and is stopped at that position (#16). Then, in accordance with the aspect ratio and the shooting direction (i.e. whether portrait or landscape, which is the top side, and others) read out by the data reader 103 from the film 107, the picture of that frame is reproduced by projection.

Figure 24:
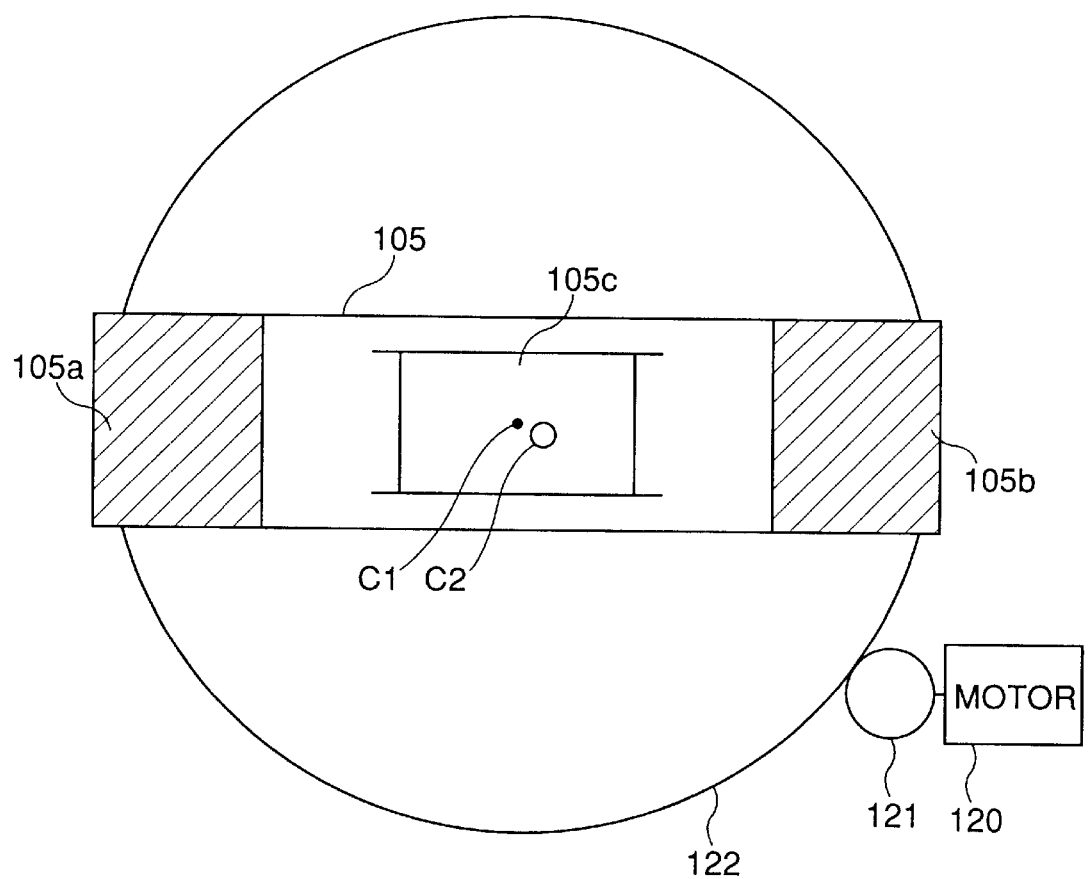
FIG. 24 is a diagram showing the construction of the film transport mechanism of the third embodiment.

To achieve reproduction of a picture by projection in accordance with the specified aspect ratio and shooting direction, the feeder 105 is constructed as shown in FIG. 24, for example. The rotary disk 122 is rotated by the motor 120 and the transmission mechanism 121 for transmitting the rotation of the motor 120. The feeder 105 is arranged in such a way that the center C1 of the picture of the frame coincides with the center C2 of rotation of the rotary disk 122. It is possible to substitute any rotary member for the rotary disk 122.

In accordance with the specified shooting position (i.e. whether portrait or landscape, which is the top side), the motor 120 rotates the rotary disk 122. In accordance with the specified aspect ratio of the frame (i.e. C, H, or P), the aperture 105c of the feeder 105 is controlled. As a result, when a picture is reproduced, the specified aspect ratio and shooting direction are automatically reflected. The feeder 105 also has a winder 105a for rewinding the loaded film 107 (see FIG. 22) and a cartridge chamber 105b for accommodating the cartridge 4c.

After projection, as shown in FIG. 23, whether a request for ending reproduction has been made is checked (#18). If, in step #14, the two identification numbers disagree, the controller 104 controls the LCD 102 to display thereon a message requesting the replacement of cartridge 4c (#17). This message is displayed to indicate that the currently loaded silver-halide film is not the one that was used for simultaneous shooting in combination with the currently loaded video tape. Thereafter, the operation sequence proceeds to step #18.

If, in step #18, a request for ending reproduction has not been made, the operation sequence returns to step #9 to continue reproduction. On the other hand, if a request for ending reproduction has been made, whether the user has turned off the power of the video reproducing apparatus V is checked (#19). Also, if, in step #10, the user performs the operation for ending reproduction of the tape, the operation sequence proceeds to step #19. When the power has not been turned off, the operation sequence returns to step #8, and the image reproducing apparatus waits for the user to perform the operation for starting reproduction of the tape 111.

On the other hand, when the power has been turned off, the controller 116 sends a control signal via the control line 118 to cut off the power supply to the slide projector S. This causes the slide projector S to rewind the silver-halide film 107 and put it into a ready-for-ejection state, and thereafter the slide projector S is turned off (#20). At the same time, the video reproducing apparatus V is also turned off (#21).

Figure 25:
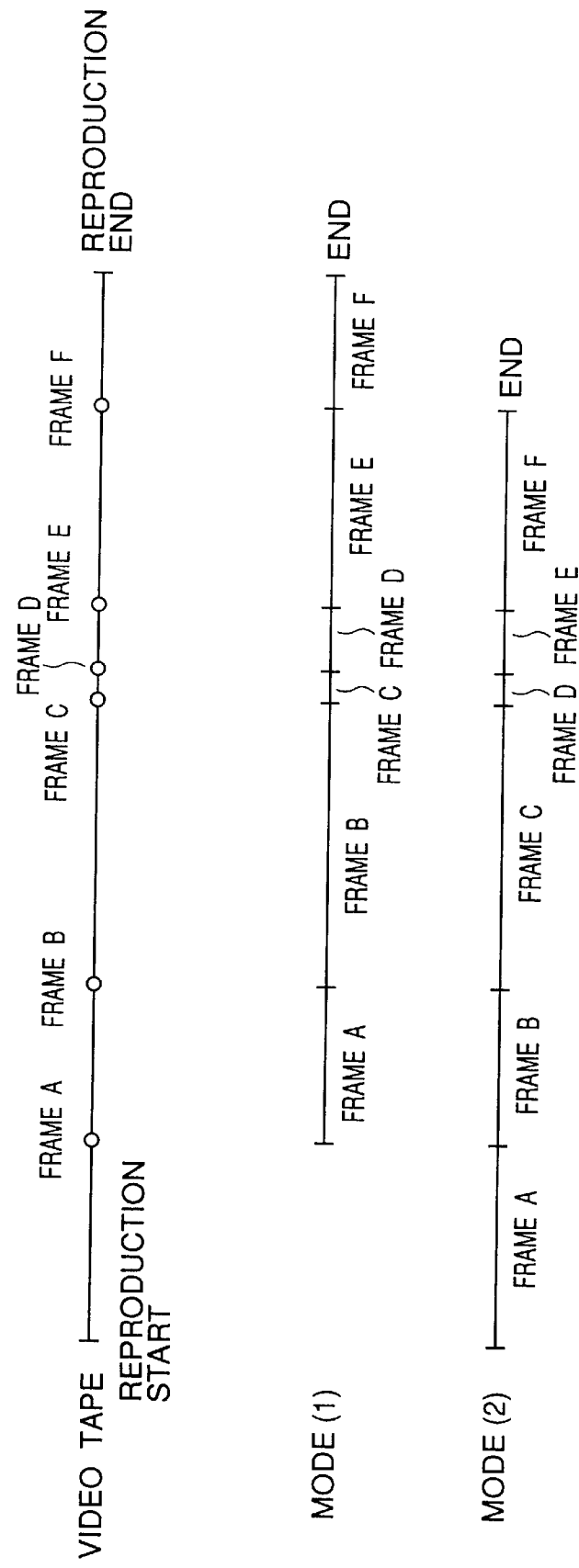
FIG. 25 is a time chart of an example of a picture reproduction sequence in the third embodiment.

FIG. 25 shows a time chart of an example of a reproduction sequence. The positions on the tape 111 at which silver-halide film shooting flags are recorded are marked with a circle (○) and the frames at those positions are referred to as frames A to F. In reproduction mode (1), when reproduction is started, only the sounds recorded on the video tape 111 (see FIG. 22) are outputted at first. Thereafter, when the video reproducing apparatus V detects the silver-halide film shooting flag for frame A, the slide projector S starts reproducing frame A by projection.

Next, when the silver-halide film shooting flag for frame B is detected, projection of frame B is started. In this way, switching of reproduced frames is achieved by detecting silver-halide film shooting flags. When ending of reproduction is requested, reproduction is ended. As a variation of reproduction mode (1), it is possible, just when reproduction is started, to fast-feed the video tape 111 to the flag for frame A to start projection and sound output therefrom.

On the other hand, in reproduction mode (2), when reproduction is started, reproduction of frame A by projection is started immediately. When the silver-halide film shooting flag for frame A is detected, reproduction of frame B by projection is started. In this way, switching of reproduced frames is achieved by detecting silver-halide film shooting flags. If frames A to F are recorded on the film 107, reproduction is continued up to the silver-halide film shooting flag for frame F. Thereafter, only the sounds are outputted. When ending of reproduction is requested, reproduction is ended. Switching of reproduced frames is performed as long as silver-halide film shooting flags are recorded on the tape 111, even if those flags do not originate from simultaneous shooting.

As described above, the system of the third embodiment allows the user to listen to the sounds of a video while viewing silver-halide film pictures. Here, high-quality silver-halide film pictures are switched automatically, and therefore the user can easily enjoy silver-halide film pictures to the accompaniment of the sounds from a video tape 111. It is also possible to connect a monitor apparatus such as a television monitor to the video reproducing apparatus V (see FIG. 22) so that, not only the sound processor 113, but also an image processor (not shown) is put into operation. This makes the system capable of presenting video pictures in addition to silver-halide film pictures and sounds.

When pictures are reproduced from negative films, a film scanner (not shown) may be used in place of the slide projector S (see FIG. 22). A film scanner has a photoelectric conversion element such as a CCD (charge-coupled device), and reads silver-halide film pictures by converting the light shone onto a film into an electric signal by means of the photoelectric conversion element. A film scanner, when connected to the video reproducing apparatus V (see FIG. 22), can be controlled just as described above to reproduce silver-halide film pictures on a monitor device such as an HDTV (high-definition television) monitor or a monitor of a personal computer.

It is also possible to use the image shooting apparatus (FIG. 20) as the video reproducing apparatus V (FIG. 22) and connect it to the slide projector S. In that case, no other video reproducing apparatus V is necessary than the camera (FIG. 20), and thus it is possible to reduce the circuit scale of the system.

Fourth Embodiment

A fourth embodiment of the present invention will be described with reference to FIGS. 2, 3, 7, 20, and 26 to 30. The image reproducing apparatus of this embodiment, too, realizes effective viewing of pictures taken by an image shooting apparatus (FIG. 20) capable of simultaneous shooting, through matching of pictures shot on a silver-halide film 202 with pictures shot on a video tape 210.

The image shooting apparatus used in the fourth embodiment is the same as the one used in the first embodiment and described earlier with reference to FIG. 20. Accordingly, no explanation will be repeated as to the image shooting apparatus.

Figure 26:
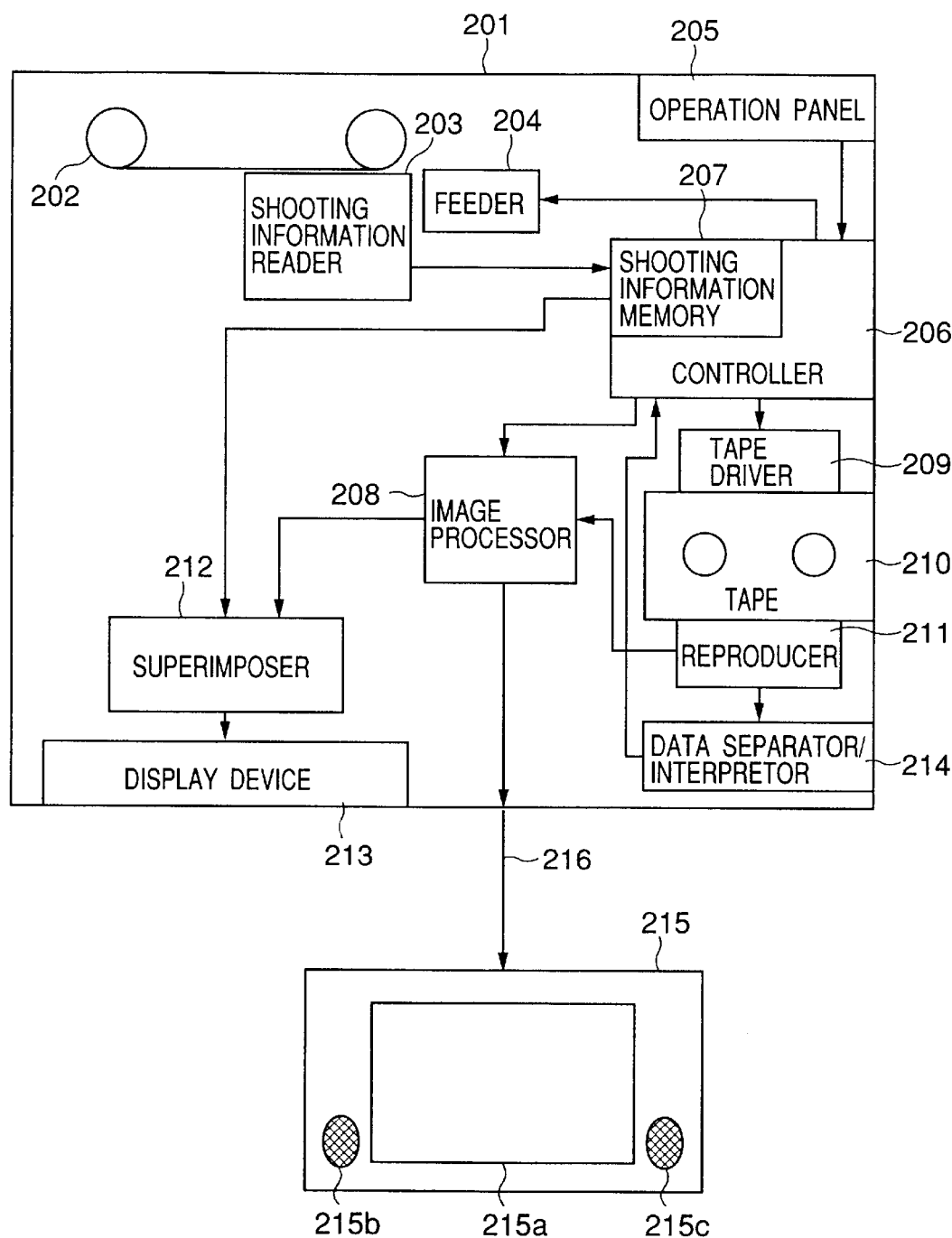
FIG. 26 is a block diagram of a fourth embodiment of the invention.

The image reproducing apparatus of the fourth embodiment for reproducing video pictures by using a film 202 and a video tape 210 on which pictures have been recorded by the above image shooting apparatus (FIG. 20) will be described. FIG. 26 is a block diagram showing the system configuration of the image reproducing apparatus. This image reproducing apparatus 201 is an apparatus for reproducing video pictures, and, in addition, has a function to read shooting information (FIG. 7) from a silver-halide film (silver-halide film picture recording medium) 202. The image reproducing apparatus 201 reads out shooting information from the silver-halide film 202 by means of a reader 203, and, in accordance with the shooting information, reproduces pictures from the video tape (video picture recording medium) 210 in the form of a digest. Whenever silver-halide film shooting, including simultaneous shooting, is performed, a flag indicating that silver-halide film shooting has been performed is recorded on the video tape 210 together with a frame or a series of frames (lasting for about one second) that contains a picture identical with the silver-halide film picture taken at that time. It is possible to use, as the image reproducing apparatus 201, the one provided in the image shooting apparatus (FIG. 20).

The controller 206 is a microcomputer that controls various parts of the image reproducing apparatus 201. The controller 206 also serves to store the shooting information read from the film 202 by the reader 203 to a shooting information memory 207. The shooting information reader 203 may be provided as a separate unit so that the portion for reading silver-halide film information and the portion for reproducing video pictures are formed as separate apparatuses.

The feeder 204 has a motor and related components to feed the film 202 in accordance with instructions from the controller 206. The operation panel 205 is provided with, for example, a power switch and other switches that are operated to request starting and ending of reproduction. The signals generated by those switches are transmitted from the operation panel 205 to the controller 206. The controller 206 controls the tape driver 209 to drive the video tape 210.

The reproducer 211 has a magnetic head to reproduce video pictures recorded on the tape 210. The signals of the video pictures are sent to the image processor 208. The data separator/interpreter 214 separates shooting information from the signal reproduced by the reproducer 211 and interprets the shooting information. The data separator/interpreter 214 then sends the results of separation and interpretation to the controller 206; for example, it sends the shooting date and shooting time (FIG. 7). The image processor 208 first stores the pictures in an image memory (not shown) or the like for temporary storage, and then, in accordance with instructions from the controller 206, processes image signals. The image processor 208 sends video pictures to a monitor apparatus such as a television monitor 215 via a signal line 216.

The monitor apparatus 215 includes a display device 215a such as a cathode-ray tube and loudspeakers 215b and 215c. The image processor 208 sends the pictures to a superimposer 212, where character-based information such as the shooting information from the controller 206 is superimposed on the pictures. The resulting pictures are displayed on the screen of a display device 213 such as a liquid crystal panel.

Figure 27:
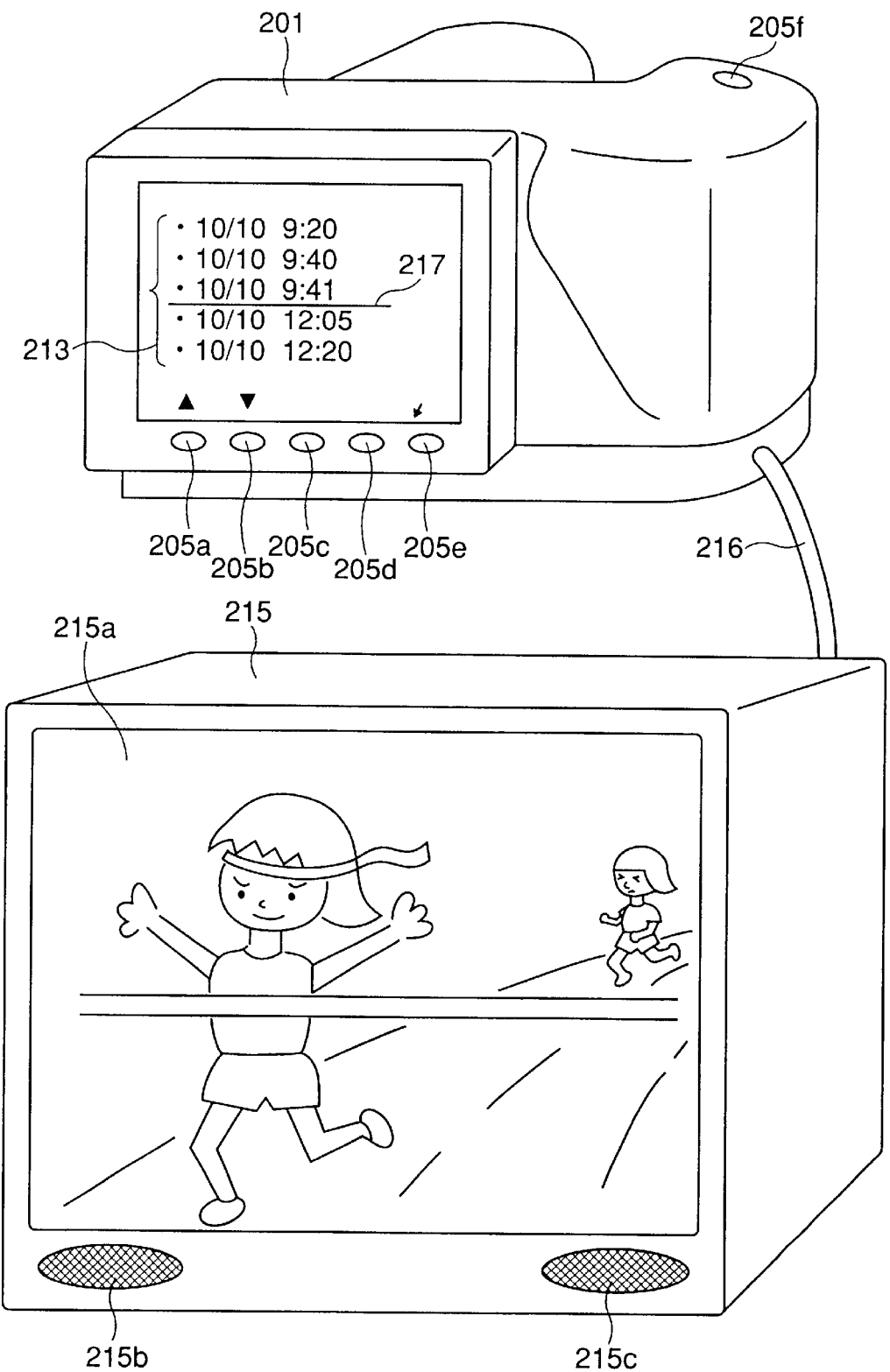
FIG. 27 is a perspective view showing the appearance of the fourth embodiment.

FIG. 27 is a perspective view showing the appearance of the image reproducing apparatus of the fourth embodiment. In FIG. 27, those components which are shown also in FIG. 26 are identified with the same reference symbols. Here, the image shooting device (FIG. 20) is used as the image reproducing apparatus 201. In FIG. 27, a list of the shooting information concerning the film 202 is displayed on the display device 213 of the image reproducing apparatus 201. In the list, the cursor 217 can be moved upward and downward through operation of the operation buttons 205a and 205b.

A silver-halide film picture is selected through operation of the selection button 205e. In accordance with the selection made by using the operation buttons 205a and 205b and the selection button 205e, a video picture reproduced from the video tape 210 loaded in the camera is sent via the signal line 216 to the monitor apparatus 215, as will be described in detail later. The monitor apparatus 215 then displays the video picture on the display device 215a, and outputs the sounds from the loudspeakers 215b and 215c. The other operation buttons 205c and 205d are for use in other operation modes only. Silver-halide film shooting is performed through operation of the release button 205f.

Figure 28:
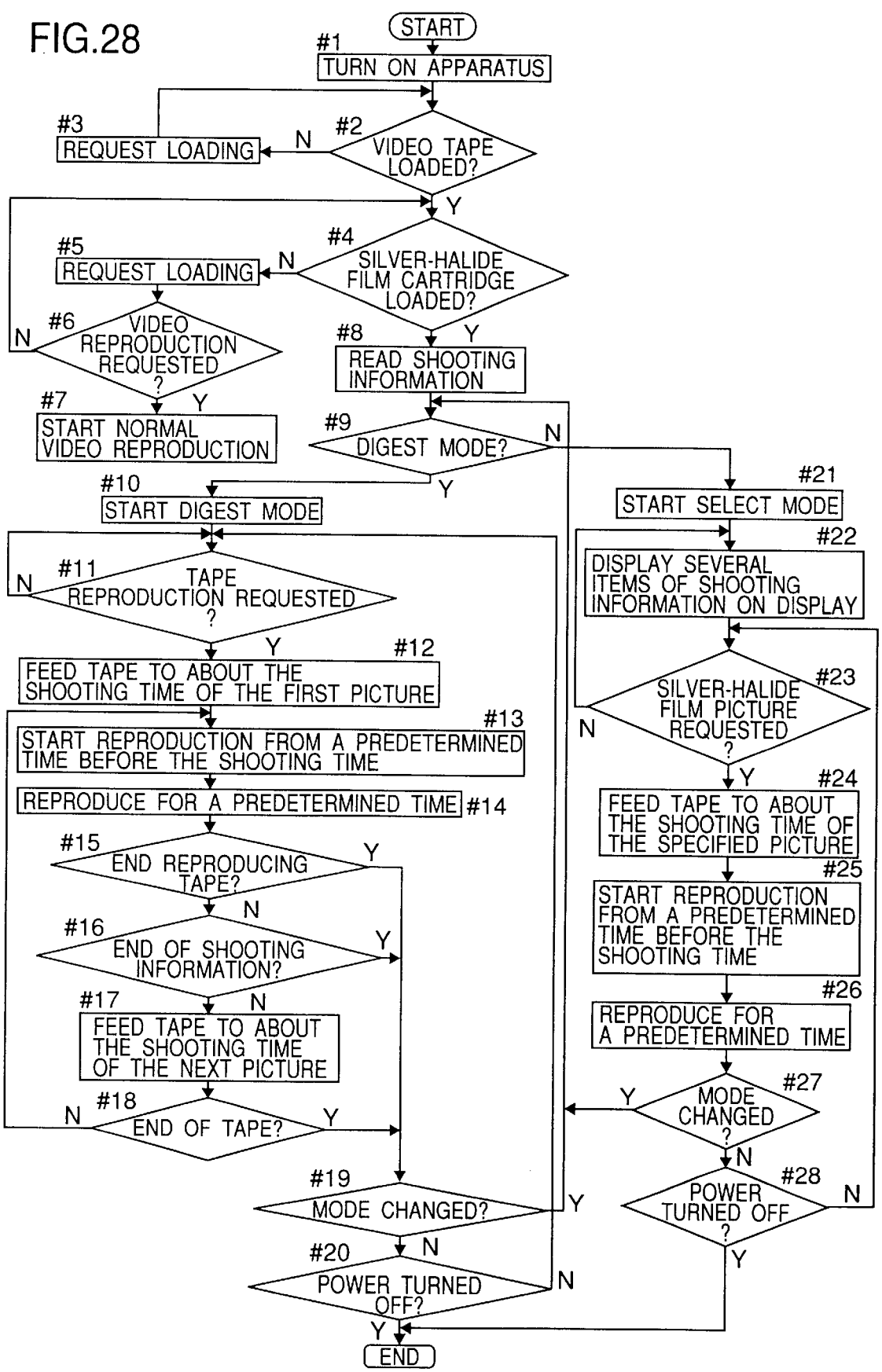
FIG. 28 is a flowchart of the operation sequence of the fourth embodiment.

The operation sequence of the fourth embodiment will be described with reference to FIG. 28. When the apparatus 201 is turned on (#1), the controller 206 checks whether a video tape 210 is loaded (#2). If not, the controller 206 controls the superimposer 212 to display on the display device 213 a message requesting the loading of a video tape. The operation sequence then returns to step #2. If a video tape is loaded, the controller 6 checks whether a silver-halide film cartridge 202c (corresponding to the cartridge 4c of FIG. 3) is loaded (#4).

If a silver-halide film cartridge is not loaded, the controller 206 controls the superimposer 212 to display a message requesting the loading of a silver-halide film cartridge (#5). While this message is displayed, whether reproduction of the video has been requested is checked (#6). If reproduction of the video has been requested, normal reproduction of the video is started regardless of the shooting information (#7). If reproduction has not been requested, whether the silver-halide film cartridge 202c is loaded is checked (#4). If, in step #4, a silver-halide film cartridge 202c is loaded, the controller 206 instructs the shooting information reader 204 to read out all the shooting information recorded on the film 202 (#8).

The shooting information thus read out is stored in the shooting information memory 207. The shooting information memory 207 has the capacity of storing at least the data of a whole role of film. Then, whether the reproduction mode that the user has selected from the operation panel 205 is the digest mode is checked (#9). If it is the digest mode, the operation sequence proceeds to step #10 to start the digest mode; if it is not the digest mode, the operation sequence proceeds to step #21 to start the select mode.

When the digest mode is started, the operation sequence waits for a request for starting reproduction of the tape (#11). When such a request is made, the first shooting date and time are read from the shooting information read out in step #8, and the tape 210 is fed to a position approximately corresponding to that time (#12). As the tape 210, a DVC is used.

The image reproducing apparatus 201, when it feeds the tape 210 in step #12 while reading the shooting date and time recorded thereon, does not require the rewinding of the tape 210 since it knows the position to which the tape 210 should be fed in advance. Reproduction is started at the position a predetermined length of time before the shooting time of a silver-halide film picture as read from the shooting information (#13), and is continued for a predetermined length of time (#14). Meanwhile, a video picture is reproduced so that it includes the shot taken simultaneously with the silver-halide film picture.

Next, whether ending of reproduction has been requested from the operation panel 205 is checked (#15). If not, the shooting date and time of the next silver-halide film picture are read from the shooting information memory 207. At this time, whether the shooting information has reached its end is checked (#16). If it has been possible to read new shooting date and time, the tape 210 is fed to a position approximately corresponding to those date and time (#17). Since the tape 210 has shooting dates and times recorded on it, it is possible to feed the tape 210 quickly while reading those dates and times.

While the tape 210 is being fed, the video picture that bears the silver-halide film shooting flag used for the preceding reproduction is stored in the image memory and is displayed on the monitor device 215. When the feeding of the tape 210 is finished, whether the tape 210 has been fed to its end is checked (#18). If not, the tape 210 is fed to the position a predetermined length of time before the shooting time of the currently targeted silver-halide film picture, and then reproduction of the video is started (#13).

During reproduction, the operations in steps #13 to #18 are repeated. Meanwhile, if ending of reproduction is requested in step #15, or if the shooting information has reached its end in step #16, or if the tape 210 has been fed to its end in step #18, reproduction is ended, and whether a change in the reproduction mode has been requested is checked (#19). If not, whether the power switch on the operation panel 205 has been turned off is checked (#20). If the power switch has been turned off, the operation sequence ends.

If, in step #19, a change in the mode has been requested, the operation sequence returns to step #9 to check whether the current mode is the digest mode, and, if so, it proceeds to step #21 to start the select mode. The select mode will be described later. If, in step #20, the power switch has not been turned off, the operation procedure waits for a request for starting reproduction of the tape (#11).

An example of a video reproduction sequence in the digest mode will be described with reference to the time chart shown in FIG. 29. How long the video picture is reproduced for each silver-halide film picture can be set freely through operation from the operation panel 205. For example, it can be set to include 10 seconds before and 10 seconds after the moment at which a silver-halide film was shot.

In the row labeled "A" are shown time codes that are recorded on the tape 210 from the starting end thereof and that indicate times in minutes. In the row labeled "B" is shown the recording of the video picture. In the row labeled "C" are shown shooting dates and times that are recorded on the tape 210 by the clock (not shown) incorporated in the image shooting apparatus (FIG. 20) used in shooting. Arrows (1), (2), and (3) indicate positions where the video picture is discontinuous because shooting was suspended for a while and restarted afterwards.

In the row labeled "D" are shown flags indicating that silver-halide film shooting was performed. The shooting dates and times that are read out from the silver-halide film 202 when the shooting information is read out in step #8 in FIG. 28 coincide with the shooting dates and times at which silver-halide film shooting flags are recorded in the row "D", as long as the silver-halide film 202 is the one used in the image shooting apparatus (FIG. 20). A silver-halide film shooting flag is recorded also when simultaneous shooting is performed.

Figure 29:
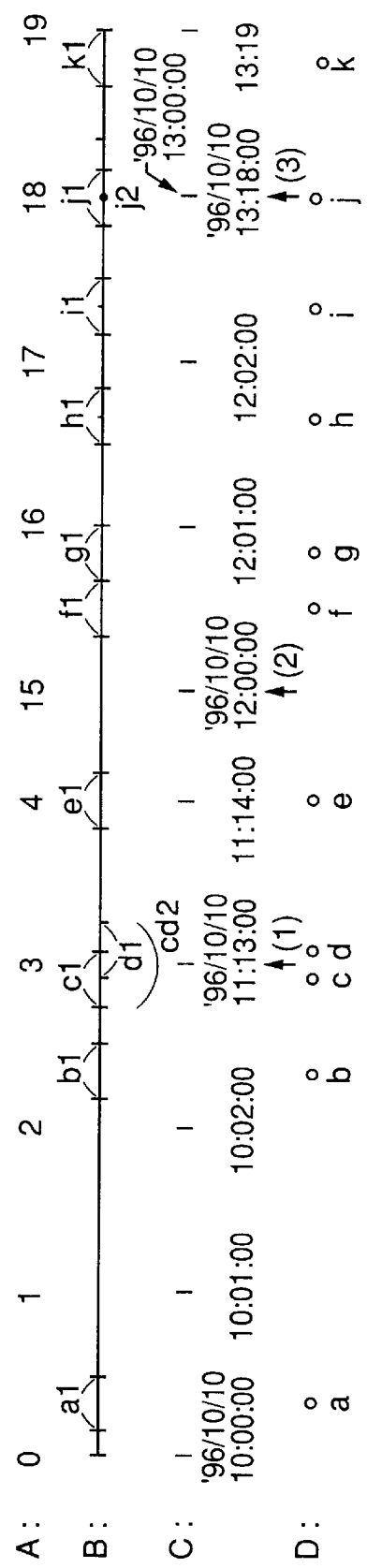
FIG. 29 is a time chart of an example of a reproduction sequence in the digest mode in the fourth embodiment.
Figure 30A:
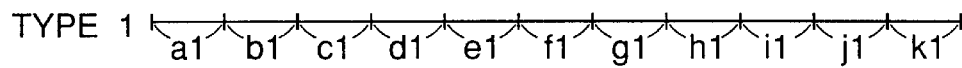
FIGS. 30A and 30B are diagrams showing examples of reproduction patterns.
Figure 30B:
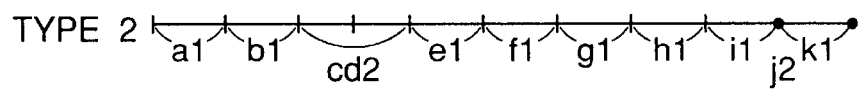

FIGS. 30A and 30B show two types of reproduction sequence that can be obtained in the digest mode from the example shown in FIG. 29. In type 1 reproduction (FIG. 30A), as soon as a request for starting reproduction is made, the controller 6 reads the first shooting date and time (96/10/10.10:00:20) stored in the shooting information memory 207. These correspond to the shooting date and time at which the silver-halide film shooting flag a is recorded on the tape 210. Then, the tape 210 is fed, for example, to the position 10:00:10, i.e. 10 seconds before the target time, and, from that position, the video is reproduced, for example, for 20 seconds, as indicated as the portion a1 in FIG. 29.

Next, the controller 206 reads the next shooting time (96/10/10.10:02:20), which corresponds to the flag b, from the shooting information memory 207. Then, the tape 210 is fed to the position 10:02:10, i.e. 10 seconds before the target time, and, from that position, the video is reproduced for 20 seconds, as indicated as the portion b1. After ending the reproduction of a1 until starting the reproduction of b1, the picture at the time at which the silver-halide film shooting flag a is recorded is stored in the image memory, and, from there, the picture is outputted.

Next, the controller 206 reads the next shooting time (96/10/10.10:02:55), which corresponds to the flag c. The tape 210 is fed to the position 10:02:45, i.e. 10 seconds before the target time, and, from that position, reproduction of the video is started. These operations are repeated. In this way, a video that takes 19 minutes when reproduced in an ordinary way takes only 3 minutes and 40 seconds (excluding the times needed to feed the tape 210) when reproduced in the form of a digest consisting of the portions a1 to k1.

Type 2 reproduction (FIG. 30B) further reduces the reproduction time, and can cope with the switching of video pictures and the recording of silver-halide film pictures for use as images for confirmation (described later). For example, during the interval as short as 10 seconds between the silver-halide film shooting flags c and d, video pictures are switched as indicated by arrow (1). In type 2 reproduction, for the flag c, the video is reproduced from 10 seconds before the flag c until the moment of switching, and, for the flag d, the video is reproduced from the moment of switching until 10 seconds after the flag d. All in all, the portion cd2 is reproduced.

The flag j indicates that only silver-halide film shooting, and therefore no simultaneous shooting, was performed. When only silver-halide film shooting is performed, the image shooting apparatus records, as a picture for use as an image for confirmation, a frame or a series of frames (lasting for about one second) that contains the picture identical with the silver-halide film picture taken at that time. Since video pictures are switched at the flag j, only j2 is reproduced in type 2 reproduction. This is achieved by reading the simultaneous shooting information (when the simultaneous shooting information indicates that no simultaneous shooting has been performed).

As a result, if it is assumed that the picture referred to by the flag j was recorded only in one frame, the reproduction of the portions a1 to k1 takes 3 minutes and 10 seconds (excluding the times needed to feed the tape 10). Since reproduction of j2 ends in an instant, it may be reproduced as a still picture for a few seconds.

Next, the operation sequence in the select mode will be described with reference to FIG. 28. The shooting information stored in the shooting information memory 207 is displayed on the display device 213 as shown in FIG. 27 (#22). Whether a particular silver-halide film shooting time has been specified or a particular picture has been selected from the operation panel 205 is checked (#23). In the example shown in FIG. 27, the cursor 217 can be moved upward and downward by operating the buttons 205a and 205b and a selection is made by operating the button 5e.

If no selection has been made, the shooting information is kept displayed on the display device 213 (#22). If a selection has been made, the tape 210 is fed to a position approximately corresponding to the shooting time of the selected item of the shooting information (#24). Then, the tape 210 is fed to the position a predetermined length of time before the selected shooting time, and reproduction of the video is started from that position (#25).

That portion of the video which includes the shot taken simultaneously with the selected silver-halide film picture is reproduced for a predetermined length of time (#26). For example, the video is reproduced from 10 seconds before the shooting of the silver-halide film picture until 10 seconds after it. Then, whether a change in the reproduction mode has been requested is checked (#27). If a change in the mode has been requested, the operation sequence proceeds to step #9; if not, whether the power switch has been turned off is checked (#28). If the power switch has been turned off, the operation sequence ends; if not, it returns to step #23.

During the interval after the next request for reproduction in step #23 until starting of reproduction, the picture at the shooting time at which the silver-halide film shooting flag is recorded is stored in the image memory just as in the digest mode, and the image reproducing apparatus 1 outputs the picture from the image memory.

In the select mode, it is also possible to reproduce the desired portion of the video by, instead of selecting a particular item of the shooting information with the cursor 217, entering the shooting information (such as the shooting date and time and the frame number) recorded on the silver-halide film 202.

The user tends to perform silver-halide film shooting only at such moments that he or she feels are exceptionally impressive. The digest mode, exploiting this fact, allows the user to view a video in relatively a short time by presenting it in the form of a digest consisting of key portions extracted automatically therefrom. On the other hand, the select mode allows the user to view only selected portions of a video, a convenient feature for video editing.

Fifth Embodiment

Figure 31:
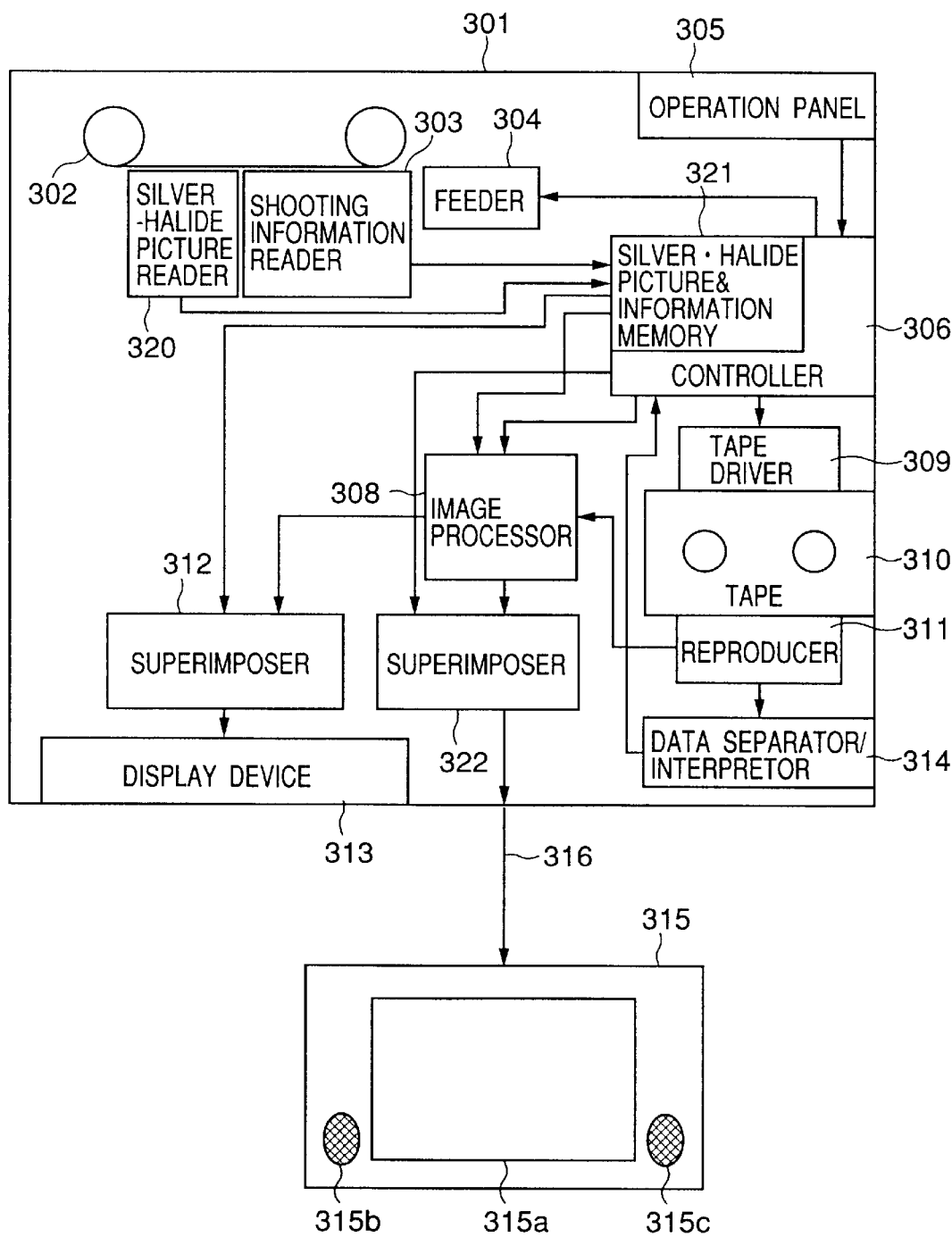
FIG. 31 is a block diagram of a fifth embodiment of the invention.

A fifth embodiment of the present invention will be described with reference to FIGS. 20 and 31 to 34. FIG. 31 is a block diagram of the system configuration of the fifth embodiment. In FIG. 31, the components represented by the reference numbers 301 to 316 correspond to those represented by the reference numbers 201 to 216 in FIG. 26, and therefore overlapping explanations will not be repeated. The fifth embodiment differs from the fourth embodiment shown in FIG. 26 mainly in that it is additionally provided with a silver-halide film picture reader 320 for reading silver-halide film pictures from the film 302, and in that the memory 321 provided in its controller 306a is a silver-halide film picture/shooting information memory for storing both shooting information and silver-halide film pictures.

The silver-halide film picture reader 320 converts the light shone onto the film 302 to an electric signal by means of a photoelectric conversion device such as a CCD. When shooting information is read, silver-halide film pictures are also read, and both are stored on the silver-halide film picture/shooting information memory 321. In addition, in accordance with instructions from the controller 306a, a superimposer 322 superimposes character-based information and a silver-halide film picture on the video picture.

As the image reproducing apparatus 301, it is possible to use an image reproducing apparatus incorporated in an apparatus capable of simultaneous shooting. The shooting information reader 303 and the silver-halide film picture reader 320 may be formed as separate units. The reproducer 311 and the shooting information reader 303 may be formed as separate units. In this embodiment, however, these readers are incorporated in the image reproducing apparatus 301.

Figure 32:
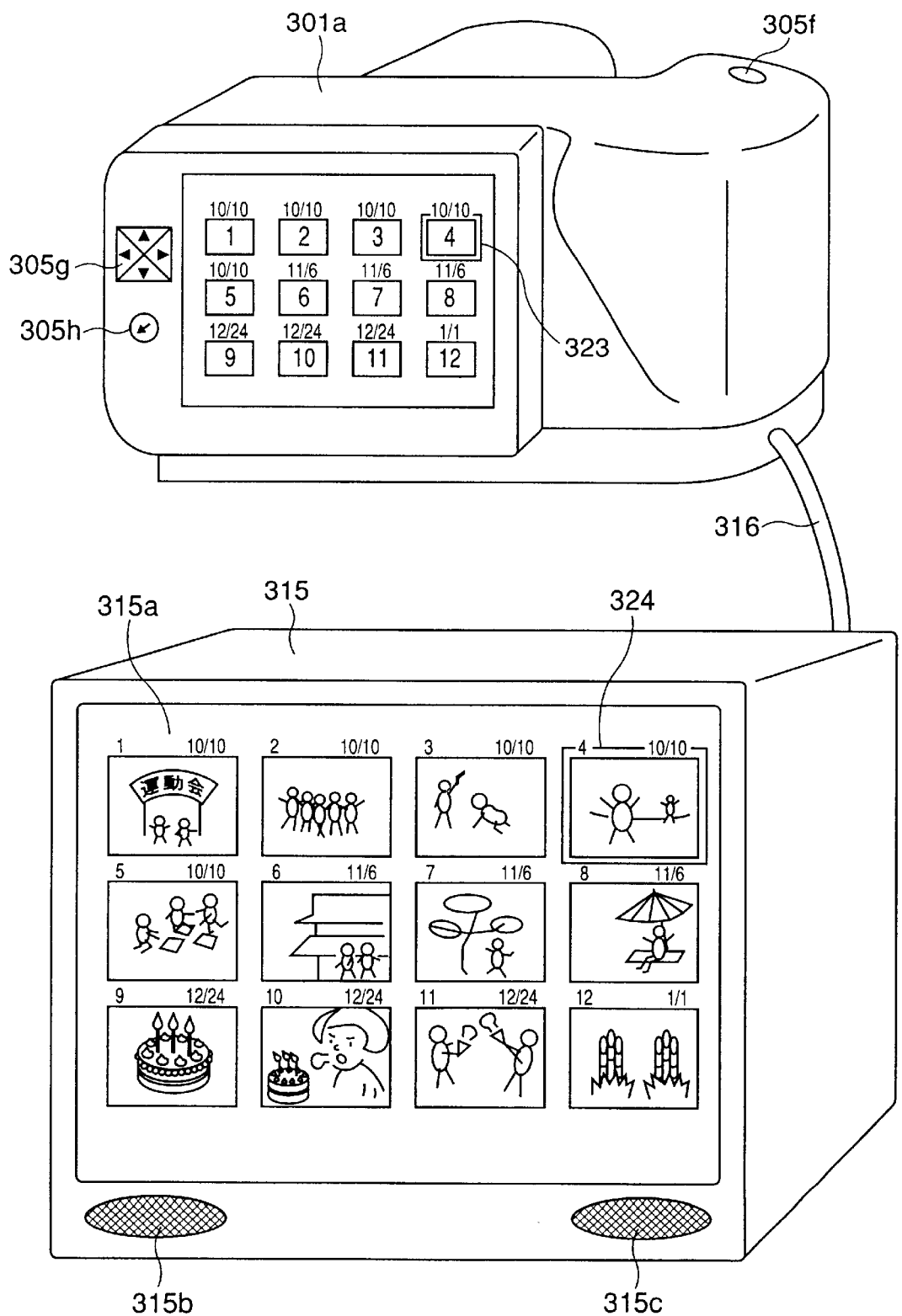
FIG. 32 is a perspective view showing the appearance of the fifth embodiment.

FIG. 32 is a perspective view showing the appearance of the fifth embodiment. In FIG. 32, such components as are shown also in FIG. 31 are identified with the same reference symbols. As the image reproducing apparatus 301, it is possible to use an apparatus that can be used also as an image shooting apparatus (FIG. 20). The operation sequence in the digest mode is exactly the same as in the fourth embodiment. On the other hand, in the select mode, as shown in FIG. 32, the frame number and the shooting date are displayed on the display device 313.

A silver-halide film picture is displayed in the same position on the display device 315a of the monitor apparatus 315 as on the display device 313 of the image reproducing apparatus 301. The frame number and the shooting date are also displayed. The cursors 323 and 324 can be moved by operating the select switch 305g, and a selection is made by operating the button 305h. After selection, that portion of the video picture which includes the shot taken simultaneously with the selected silver-halide film picture is displayed for a predetermined length of time, just as in the fourth embodiment. Silver-halide film shooting is performed through operation of the release button 305f.

Figure 33:
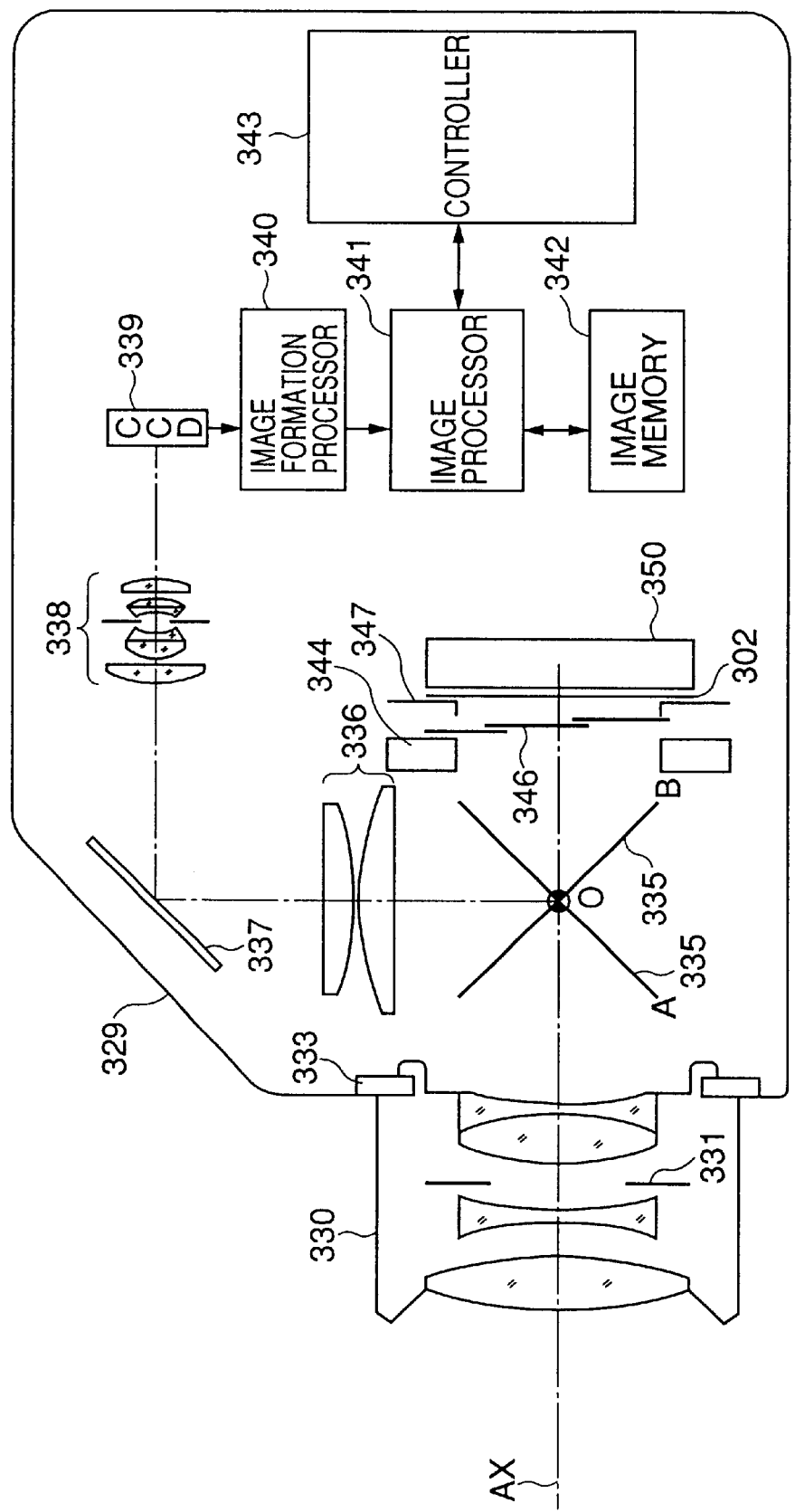
FIG. 33 is a block diagram of an example of the portion related to the reading of silver-halide film pictures in the image shooting apparatus of the fifth embodiment.

FIGS. 33 and 34 show examples of the construction of the portion for reading silver-halide film pictures in the image reproducing apparatus 301 that can be used also as an image shooting apparatus (FIG. 20). In FIG. 33, a main lens 330 is mounted on a camera body 329 through a mounting member 333 that exploits, for example, screw engagement. The main lens 330 consists of a plurality of lenses and a main lens aperture diaphragm 331. During shooting, a half mirror 335 is placed in position A. The light having passed through the main lens 330 is split up by the half mirror 335.

A shutter driver 344 opens and closes a shutter 346 in accordance with instructions from the controller 343. A film 349 is exposed to the light having passed through the half mirror 335 when the shutter 346 is released, and thereby a latent image is formed on the film 302. A backlight 350 has an incandescent or fluorescent lamp in it, and serves also as a pressing plate for holding the film 302. Holders 347 help hold the film 302 by pressing it against the backlight 350.

The light reflected by the half mirror 335 is condensed by a condenser lens 336, and is reflected by a mirror 337. The light is then subjected to adjustments by a relay optical system for reimaging, and is eventually converted into an electric signal by a CCD (charge-coupled device) 339. The electric signal is then converted into a digital signal through subsampling and other processing by an image formation processor 340.

The digital signal is sent to an image processor 341. The image processor 341 performs conversion and other processing on the luminance signal and the color-difference (Y/C) signal. During processing, images are stored in an image memory 342. A controller 343 performs operations necessary to record images onto the video tape 310 loaded in the camera body 329 and to display the images on the display device 313 of the camera.

For reproduction, a developed film is loaded in place of the film 302, and the half mirror 335 is moved to position B about an axis O. In the main lens 330, the aperture diaphragm 331 is controlled so that light is shut off or minimized. Part of the light shone from the backlight 350 through the film 302 is reflected by the half mirror 335.

The reflected light is subjected to focus adjustment by the relay optical system 338, and is then converted into an electric signal by the CCD 339. In this way, a silver-halide film picture on the developed film is read. This construction makes it possible to perform shooting and reproduction with a signal apparatus. Note that the optical axis AX is represented by dash-and-dot lines.

FIG. 34 shows an apparatus for reading silver-halide film pictures that is of an interchangeable-lens type. In FIG. 34, such components as are shown also in FIG. 33 are identified with the same reference symbols, and overlapping explanations will not be repeated. During shooting, the main lens 330 (see FIG. 33) is mounted on the camera body 360, and the half mirror 351 is placed in position A.

For reproduction, a developed film is loaded in place of the film 302, an image reproducing apparatus 352 of the interchangeable-lens type is mounted on the camera body 360, and the half mirror 351 is moved to position B. The light shone from the backlight 350 through the developed film is directed to the lens of the image reproducing apparatus 352. The light is then converted into an electric signal by the CCD 354. The electric signal is converted into a digital signal through the processing by the image formation processor 353. The resulting signal is sent to the image processor 341. In this way, a silver-halide film picture is read. Note that exposure of the CCD 354 is achieved by the shutter 346 or by an electronic shutter.

Some digital video cameras of today permit recording of still pictures, and, in such cameras, the shooting times of still pictures are recorded in a semiconductor memory in a video cassette. This can be exploited, by replacing the silver-halide film picture shooting information in the previous examples with still pictures recorded on the semiconductor memory, to provide a digest mode and a select mode and thus to realize the same effects as achieved in the previous examples even within a single video cassette.

What is claimed is:

1. An image reproducing apparatus for use with a system that records still pictures on a first recording medium and moving pictures on a second, different recording medium and that records simultaneous shooting information on both recording media when simultaneously shooting and recording an image on the first recording medium as a still picture is performed during shooting and recording a moving picture on the second, different recording medium, said simultaneous shooting information indicating that simultaneously shooting and recording the image on said first recording medium as a still picture is performed during shooting and recording the moving picture on said second, different recording medium, said image reproducing apparatus comprising:

a controller for controlling reproduction of the still pictures recorded on the first recording medium in accordance with the simultaneous shooting information, wherein each image simultaneously shot and recorded on the first recording medium as a still picture during shooting and recording the moving picture on the second different recording medium is recorded during, but separately from and in a different manner than recording the moving picture so that the moving picture is recorded on the second recording medium as a compressed moving image and the still picture is recorded on the first recording medium as a high-quality image.

2. An image reproducing apparatus as claimed in claim 1, wherein the simultaneous shooting information recorded on the second recording medium is detected to switch the pictures reproduced from the first recording medium.

3. An image reproducing apparatus as claimed in claim 1, comprising:

a picture reproducer for reproducing the pictures recorded on the first recording medium; and a sound outputting section for outputting sounds corresponding to the reproduced pictures.

4. An image reproducing apparatus as claimed in claim 3, wherein the simultaneous shooting information recorded on the second recording medium is detected to switch the pictures reproduced from the first recording medium.

5. An image control method for use with a system that records a still picture on a first recording medium and a moving picture on a second, different recording medium and that records simultaneous shooting information on both recording media when simultaneously shooting and recording an image on the first recording medium as the still picture is performed during shooting and recording the moving picture on the second, different recording medium, said simultaneous shooting information indicating that the simultaneously shooting and recording the image on said first recording medium as the still picture is performed during shooting and recording of the moving picture on said second, different recording medium, said image control method comprising:

controlling reproduction of the still picture recorded on the first recording medium in accordance with the simultaneous shooting information, wherein the image simultaneously shot and recorded on the first recording medium as the still picture during shooting and recording the moving picture on the second different recording medium is recorded during, but separately from and in a different manner than recording of the moving picture so that the moving picture is recorded on the second recording medium as a compressed moving image and the still picture is recorded on the first recording medium as a high-quality image.

6. An image control method as claimed in claim 5, wherein, while the picture recorded on the first recording medium is being reproduced, a sound recorded on the second recording medium is reproduced.

7. An image control method as claimed in claim 6, wherein the first recording medium is a silver-halide recording medium and the second recording medium is a video picture recording medium, and wherein, while silver-halide picture recorded on the silver-halide recording medium is being reproduced, the sound corresponding to that silver-halide picture is reproduced.

8. An image reproducing apparatus for use with a system that records a still picture on a first recording medium and moving picture on a second, different recording medium and that records simultaneous shooting information on both recording media when simultaneously shooting and recording an image on the first recording medium as the still picture is performed during shooting and recording of the moving picture on the second, different recording medium, said simultaneous shooting information indicating that simultaneously shooting and recording of the image on said first recording medium as the still picture is performed during shooting and recording of the moving picture on said second, different recording medium, said image reproducing apparatus comprising:

a controller for controlling reproduction of the moving pictures recorded on the second, different recording medium in accordance with the simultaneous shooting information, wherein the image simultaneously shot and recorded on the first recording medium as the still picture during shooting and recording the moving picture on the second different recording medium is recorded during, but separately from and in a different manner than recording of the moving picture so that the moving picture is recorded on the second recording medium as a compressed moving image and the still picture is recorded on the first recording medium as a high-quality image.

9. An image reproducing apparatus as claimed in claim 8, further comprising:

a first simultaneous shooting information reader for reading the simultaneous shooting information from the first recording medium;

a moving picture reader for reading the moving picture from the second recording medium; and a second simultaneous shooting information reader for reading the simultaneous shooting information from the second recording medium;

wherein the controller, in accordance with the simultaneous shooting information recorded on both recording media, controls the image reproducing apparatus in such a way that a portion of the moving pictures is reproduced for a predetermined length of time, the portion of the moving picture including a shot taken simultaneously with the still picture.

10. An image reproducing apparatus as claimed in claim 8, further comprising:

a selector for selecting one of a plurality of still pictures recorded on the first recording medium, wherein the controller controls the image reproducing apparatus in such a way that that portion of the moving picture which includes a shot taken simultaneously with the picture selected by the selector is reproduced for a predetermined length of time.

11. An image reproducing apparatus as claimed in claim 10, further comprising:
   a still picture reader for reading the still pictures from the first recording means,
   wherein the still pictures are displayed on a display together with corresponding items of the simultaneous shooting information and, when the selector selects one of the thus displayed pictures, the controller controls the image reproducing apparatus in such a way that that portion of the moving picture which includes a shot taken simultaneously with the picture selected by the selector is reproduced for a predetermined length of time.

12. An image control method for use with a system that records a still picture on a first recording medium and a moving picture on a second, different recording medium and that records simultaneous shooting information on both recording media when simultaneously shooting and recording an image on the first recording medium as the still picture is performed during shooting and recording of the moving picture on the second, different recording medium, said simultaneous shooting information indicating that simultaneously shooting and recording of the image on said first recording medium as the still picture is performed during shooting and recording of the moving picture on said second, different recording medium, said image control method comprising:
   controlling reproduction of the moving pictures recorded on the second, different recording medium in accordance with the simultaneous shooting information, wherein
      the image simultaneously shot and recorded on the first recording medium as the still picture during shooting and recording of the moving picture on the second different recording medium is recorded during, but separately from and in a different manner than recording of the moving picture so that the moving picture is recorded on the second recording medium as a compressed moving image and the still picture is recorded on the first recording medium as a high-quality image.

13. An image control method as claimed in claim 12,
   wherein, in accordance with the simultaneous shooting information recorded on the first and second recording media, that portion of the moving picture recorded on the second recording medium which include shots taken simultaneously with the still picture is reproduced for a predetermined length of time.

14. An image control method as claimed in claim 12,
   wherein the first recording medium is a silver-halide recording medium and the second recording medium is a video picture recording medium and, when at least one of a plurality of silver-halide pictures recorded on the silver-halide recording medium is selected, that portion of the video picture recorded on the video picture recording medium which includes a shot taken simultaneously with the selected silver-halide picture is reproduced for a predetermined length of time.

15. An image reproducing apparatus for use with a system that records still pictures on a first recording medium and moving pictures on a second, different recording medium and that records simultaneous shooting information on both recording media when simultaneously shooting and recording an image on the first recording medium as a still picture is performed during shooting and recording of a moving picture on the second, different recording medium, said simultaneous shooting information indicating that simultaneously shooting and recording of the image on said first recording medium as a still picture is performed during shooting and recording of the moving picture on said second, different recording medium, said image reproducing apparatus comprising:
   a controller for controlling simultaneous reproduction of the still pictures and moving pictures recorded respectively on the first and second, different recording medium in accordance with the simultaneous shooting information, wherein
      each image simultaneously shot and recorded on the first recording medium as a still picture during shooting and recording of the moving picture on the second different recording medium is recorded during, but separately from and in a different manner than recording of the moving picture so that the moving picture is recorded on the second recording medium as a compressed moving image and the still picture is recorded on the first recording medium as a high-quality image.

16. An image reproducing apparatus as claimed in claim 15, further comprising:
   a first simultaneous shooting information reader for reading the simultaneous shooting information from the first recording medium;
   a first picture reader for reading the pictures from the first recording medium;
   a second simultaneous shooting information reader for reading the simultaneous shooting information from the second recording medium;
   a second picture reader for reading the pictures from the second recording medium; and
   a storage device for storing the simultaneous shooting information recorded on both recording media,
   wherein, in accordance with the simultaneous shooting information stored in the storage device, the controller controls reproduction of the pictures recorded on the first and second recording media.

17. An image reproducing apparatus as claimed in claim 16,
   wherein, in accordance with the simultaneous shooting information recorded on both recording media, time periods in which moving pictures were shot and time periods in which only still pictures were shot are recognized as separate time blocks, and, within each moving-picture time block, separate moving-picture shooting sessions are recognized as separate time blocks by detecting a starting time and an ending time of each moving-picture shooting session, and
   wherein pictures included in each time block are reproduced either in a still-picture-weighted mode or in a moving-picture-weighted mode in accordance with how many still pictures are included in that time block, the still-picture-weighted mode being a mode in which the still pictures themselves or those portions of the moving pictures which include shots taken simultaneously with the still pictures are reproduced, the moving-picture-weighted mode being a mode in which time blocks including only still pictures are excluded from reproduction.

18. An image reproducing apparatus as claimed in claim 16, consisting of:
   a silver-halide picture reproducing section constituted by the first picture reader and the first simultaneous shooting information reader; and a moving picture reproducing section constituted by the second picture reader and the second simultaneous shooting information reader.

19. An image reproducing apparatus as claimed in claim 16, wherein sounds are recorded on the second recording medium and, while the still pictures are being reproduced, sounds corresponding to the still pictures are outputted in accordance with the simultaneous shooting information.

20. An image control method for use with a system that records still pictures on a first recording medium and moving pictures on a second, different recording medium and that records simultaneous shooting information on both recording media when simultaneously shooting and recording an image on the first recording medium as a still picture is performed during shooting and recording a moving picture on the second, different recording medium, said simultaneous shooting information indicating that simultaneously shooting and recording of the image on said first recording medium as a still picture is performed during shooting and recording the moving picture on said second, different recording medium, said image control method comprising:

controlling reproduction of the still pictures and moving pictures recorded respectively on the first and second, different recording medium in accordance with the simultaneous shooting information, wherein each image simultaneously shot and recorded on the first recording medium as a still picture during shooting and recording of the moving picture on the second different recording medium is recorded during, but separately from and in a different manner than recording of the moving picture so that the moving picture is recorded on the second recording medium as a compressed moving image and the still picture is recorded on the first recording medium as a high-quality image.

21. An image control method as claimed in claim 20, wherein, in accordance with the simultaneous shooting information recorded on both recording media, those portions of the moving pictures which include simultaneously taken shots are reproduced intermittently, each for a predetermined length of time.

22. An image control method as claimed in claim 20, wherein, in accordance with the simultaneous shooting information recorded on both recording media, time periods in which moving pictures were shot and time periods in which only still pictures were shot are recognized as separate time blocks, and, within each moving-picture time block, separate moving-picture shooting sessions are recognized as separate time blocks by detecting a starting time and an ending time of each moving-picture shooting session, and wherein, within each time block, a larger proportion of reproduction time is allocated to the moving picture as the shooting time of the moving picture is shorter as compared with the number of the still pictures.

23. An image control method as claimed in claim 20, wherein, in accordance with the simultaneous shooting information recorded on both recording media, time periods in which moving pictures were shot and time periods in which only still pictures were shot are recognized as separate time blocks, and, within each moving-picture time block, separate moving-picture shooting sessions are recognized as separate time blocks by detecting a starting time and an ending time of each moving-picture shooting session, and wherein only the still pictures and moving pictures included in time blocks that include the simultaneous shooting information are reproduced.

* * * * *